United States Patent
Asuma et al.

(10) Patent No.: US 11,404,768 B2
(45) Date of Patent: Aug. 2, 2022

(54) ANTENNA DEVICE AND VEHICLE

(71) Applicant: YOKOWO CO., LTD., Tokyo (JP)

(72) Inventors: Takuya Asuma, Tomioka Gunma (JP); Masashi Noda, Tomioka Gunma (JP); Noriyoshi Nakada, Tomioka Gunma (JP)

(73) Assignee: YOKOWO CO., LTD., Tokyo (JP)

( * ) Notice: Subject to any disclaimer, the term of this patent is extended or adjusted under 35 U.S.C. 154(b) by 244 days.

(21) Appl. No.: 16/777,914

(22) Filed: Jan. 31, 2020

(65) Prior Publication Data

US 2020/0168982 A1 May 28, 2020

Related U.S. Application Data

(63) Continuation of application No. PCT/JP2018/024514, filed on Jun. 28, 2018.

(30) Foreign Application Priority Data

Jul. 31, 2017 (JP) .............................. JP2017-148633

(51) Int. Cl.
*H01Q 1/32* (2006.01)
*B60R 11/02* (2006.01)
*H01Q 1/22* (2006.01)
*B60R 11/00* (2006.01)

(52) U.S. Cl.
CPC .......... *H01Q 1/3275* (2013.01); *B60R 11/02* (2013.01); *H01Q 1/22* (2013.01); *B60R 2011/004* (2013.01)

(58) Field of Classification Search
CPC ................ H01Q 1/32–42; B60R 11/02; B60R 2011/004
See application file for complete search history.

(56) References Cited

U.S. PATENT DOCUMENTS

| | | | |
|---|---|---|---|
| 4,755,823 A | 7/1988 | Ohe et al. | |
| 2003/0068198 A1* | 4/2003 | Kozlovski | H01Q 1/1214 403/372 |
| 2005/0024280 A1* | 2/2005 | Takahashi | H01Q 1/3275 343/713 |

(Continued)

FOREIGN PATENT DOCUMENTS

| | | |
|---|---|---|
| EP | 0 214 745 | 3/1987 |
| JP | 62-37476 | 2/1987 |

(Continued)

OTHER PUBLICATIONS

International Search Report dated Sep. 18, 2018 in PCT/JP2018/024514, 2 pages.

*Primary Examiner* — Hasan Z Islam
(74) *Attorney, Agent, or Firm* — Xsensus LLP

(57) ABSTRACT

An antenna device 1 is an antenna device 1 to be mounted on a vehicle including an inner panel 17 that is provided with a mounting hole, and a roof 16 in which a region facing the inner panel 17 on an upper side of the inner panel 17 is upraised to an upper side. The antenna device 1 includes a base 12 and a fixing portion (13, 14, and 15) that fixes the base 12 to the inner panel 17. At least a part of the antenna device 1 is contained in a space 16b formed between a region 16a of the roof 16 that is upraised and the inner panel 17, and there are a plurality of portions in which the base 12 and the inner panel 17 are fixed by the fixing portion.

18 Claims, 29 Drawing Sheets

(56) References Cited

U.S. PATENT DOCUMENTS

| | | | | |
|---|---|---|---|---|
| 2006/0273968 A1* | 12/2006 | Noro | ........................ | H01Q 1/42 |
| | | | | 343/713 |
| 2009/0066593 A1* | 3/2009 | Jared | .................... | H01Q 1/3275 |
| | | | | 343/713 |
| 2011/0050518 A1* | 3/2011 | Oki | ...................... | H01Q 1/3275 |
| | | | | 343/713 |
| 2014/0292593 A1* | 10/2014 | Thiam | .................. | H01Q 9/0421 |
| | | | | 343/713 |
| 2017/0104264 A1* | 4/2017 | Kobayashi | ............ | H01Q 1/3275 |
| 2017/0179584 A1* | 6/2017 | Nakada | ................... | H01Q 1/362 |
| 2018/0053992 A1 | 2/2018 | Mizutani et al. | | |

FOREIGN PATENT DOCUMENTS

| | | |
|---|---|---|
| JP | 2016-172460 | 9/2016 |
| JP | 2017-100559 | 6/2017 |
| WO | 2016/147815 | 9/2016 |

\* cited by examiner

ANTENNA DEVICE AND VEHICLE

CROSS-REFERENCE TO RELATED APPLICATIONS

The present application is a bypass continuation of PCT filing PCT/JP2018/024514, filed Jun. 28, 2018, which claims priority to, and contains subject matter related to, Japanese Priority document JP 2017-148633, filed Jul. 31, 2017, the entire contents of both of which being incorporated herein by reference in their entirety.

TECHNICAL FIELD

The present disclosure relates to an antenna device.

BACKGROUND ART

In the related art, as described in JP 2016-172460 A, an antenna device for vehicle contained between an inner panel and a roof that is upraised to the upper side is proposed.

SUMMARY

However, as recognized by the present inventors, the antenna device and the vehicle are fixed by one screw in one place between a base of the antenna device and the roof, which gives rise to rattling between the antenna device and the vehicle.

Therefore, an aspect of the present disclosure is to provide an antenna device in which rattling with respect to a vehicle is less likely to occur.

An antenna device according to the present disclosure is an antenna device to be mounted on a vehicle including an inner panel that is provided with a mounting hole, and a roof in which a region facing the inner panel on an upper side of the inner panel is upraised to an upper side. The antenna device includes a base and a fixing portion that fixes the base to the inner panel. At least a part of the antenna device is contained in a space formed between the region of the roof that is upraised and the inner panel. The base and the inner panel are fixed by the fixing portion in a plurality of places.

In the plurality of places, the antenna device is fixed to the inner panel. For this reason, it is possible to fix the antenna device to the vehicle in a state where the rattling is less likely to occur, compared to a case where the fixing is performed in one place.

The base optionally includes an upper portion that is positioned on an upper side from the inner panel. At least one of the places in which the base and the inner panel are fixed by the fixing portion is provided in the upper portion.

The antenna device is fixed to the inner panel by using the upper portion of the base provided on the upper side. For this reason, it is possible to fix the antenna device to the vehicle in a state where the rattling is less likely to occur, while ensuring electric connection (ground connection) between the base and the inner panel.

The fixing portion may also include a bolt that extends to a lower side from the base, and a nut that is screwed to the bolt. A cutout into which the bolt is fitted before being screwed to the nut is formed integrally with the mounting hole.

A shaft portion of the bolt is fitted into the cutout, and thus, even in a previous step where the bolt and the nut are screwed, it is possible to suppress the displacement of the antenna device. The shaft portion of the bolt is a region that extends to the lower side from the base of the bolt.

Moreover, a length of at least a part of the base in a predetermined direction is greater than a length of the mounting hole in the predetermined direction.

As a consequence of the structure described herein, it is possible to suppress the displacement of the antenna device in an up-and-down direction with respect to the inner panel.

The antenna device may further include a holding claw that includes a tapered shape portion widened towards a lower side. The holding claw is capable of holding the inner panel on a lower side from the holding claw.

The holding claw is in a position relationship of facing the inner panel, and thus, it is possible to prevent the antenna device from falling to the lower side from the inner panel.

Additionally, the antenna device may further include a protrusion that is provided with the holding claw and extends to a lower side from the inner panel. The protrusion is capable of being moved in a specific direction by applying a force. The protrusion is moved in the specific direction, and thus, the holding claw is capable of being released from a state of holding the inner panel on the lower side from the holding claw.

The protrusion is bent by being pinched with fingers, and thus, it is possible to simply remove the antenna device.

According to another aspect of the disclosure, the fixing portion includes an elastic body. The base includes a lower portion that is positioned on a lower side from the inner panel. The elastic body is provided on at least one of a lower end of the holding claw and an upper surface of the lower portion.

The inner panel is interposed between the holding claw or the lower portion of the base and the elastic body, and the antenna device and the inner panel are fixed in a state where the rattling does not occur. For this reason, it is possible to prevent the antenna device from being rotated with respect to the inner panel or to suppress the displacement of the antenna device in the up-and-down direction.

In addition, a place in which the elastic body is in contact with the inner panel is less likely to be damaged by the elastic body. For this reason, it is possible to fix the antenna device and the inner panel in a state where the inner panel is less likely to be damaged.

Advantageous Effects of the Disclosure

As described above, according to the present disclosure, it is possible to provide an antenna device in which rattling with respect to a vehicle is less likely to occur.

DESCRIPTION OF EMBODIMENTS

Figure 1:
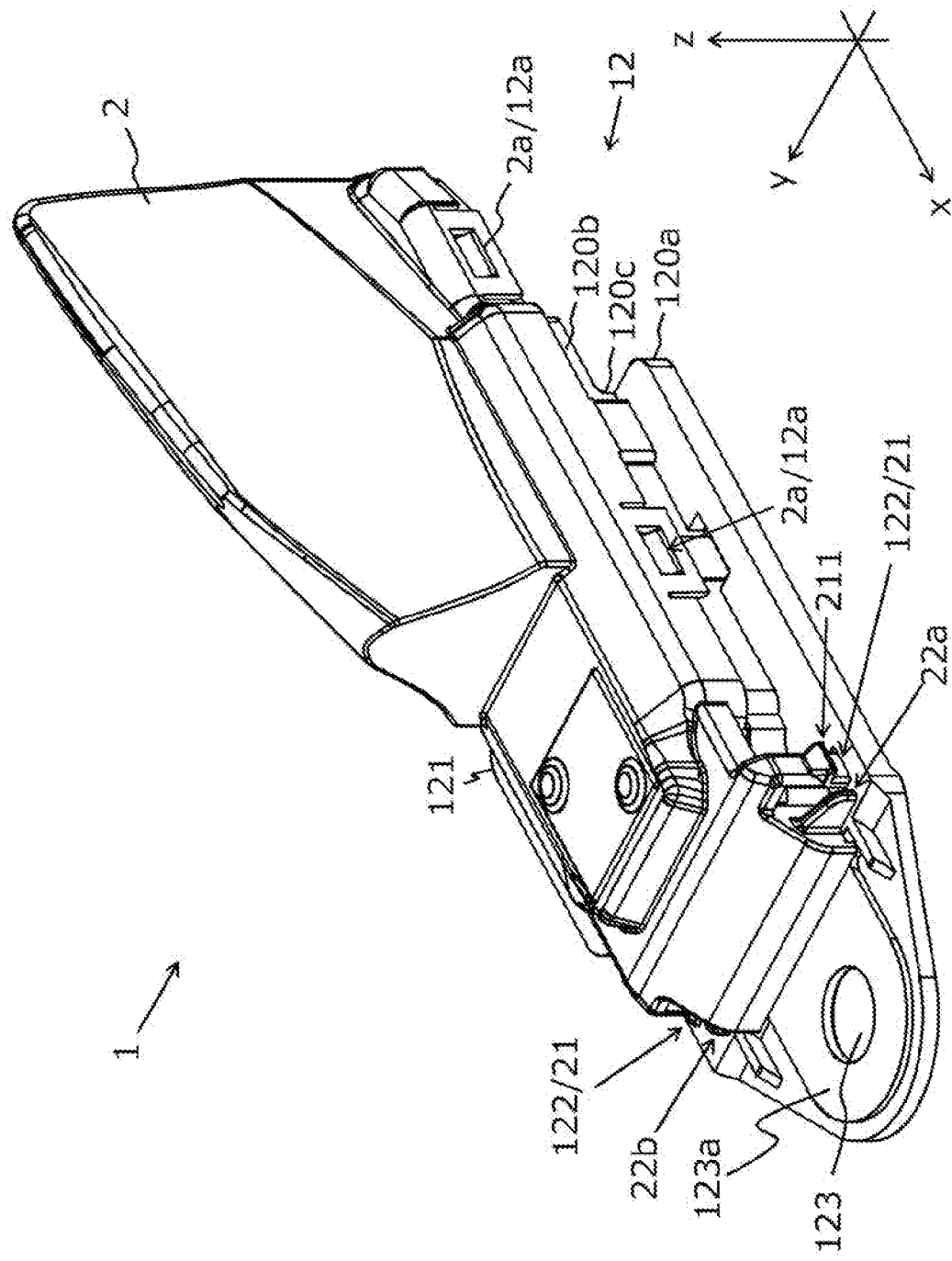
FIG. 1 is a perspective view of an antenna device of a first embodiment, from which a nut and a clip are omitted.

An aspect of the embodiments is an antenna device to be mounted on a vehicle including an inner panel that is provided with a mounting hole, and a roof in which a region facing the inner panel on an upper side of the inner panel is upraised to an upper side. The antenna device includes a base and a fixing portion that fixes the base to the inner panel. At least a part of the antenna device is contained in a space formed between the region of the roof that is upraised and the inner panel. The base and the inner panel are fixed by the fixing portion in a plurality of places.

Another aspect of the embodiments is a vehicle. This vehicle includes an inner panel having a mounting hole, a roof that opposes the inner panel, the roof having an upraised portion that extends away from the inner panel to form a space between the roof and the inner panel, and an antenna that is at least partially disposed in the space between the roof and the inner panel. The antenna includes a base, and a fixing portion that fixes the base to the inner panel in a plurality of places.

Hereinafter, a first embodiment will be described by using the drawings.

Note that, the embodiment is not limited to the following embodiment. In addition, the contents described in one embodiment are similarly applied to other embodiments, in principle. In addition, each embodiment and each modification example can be suitably combined.

An antenna device 1 of the first embodiment is mounted on an inner panel 17 that is on the upper portion of a vehicle and is on a vehicle interior side from a roof 16. The antenna device 1 includes an inner case 2, a parasitic element 3, a first antenna 4, a first double-faced tape 41, a second antenna 6, a second double-faced tape 61, a third antenna 7, a mounting screw 9, a substrate 10, a connector 11, a base 12, a clip 13, a bolt 14, and a nut 15 (refer to FIG. 1 to FIG. 17).

In order to describe the direction, a front-and-back direction of the vehicle on which the antenna device 1 is mounted is described as an x direction, a right-and-left direction that is perpendicular to the x direction is described as a y direction, and an approximate vertical direction that is perpendicular to the x direction and the y direction is described as a z direction. In FIG. 1, directions indicated by arrows of each of xyz axes are defined as a front direction, a right direction, and an upper direction, respectively.

As illustrated in FIG. 1, the inner case 2 is a member that covers a member configuring the antenna device 1 (an upper portion 120b of the base 12, and the like). The inner case 2 is a resin molded product that is formed of a synthetic resin or the like having electric wave permeability.

Figure 3:
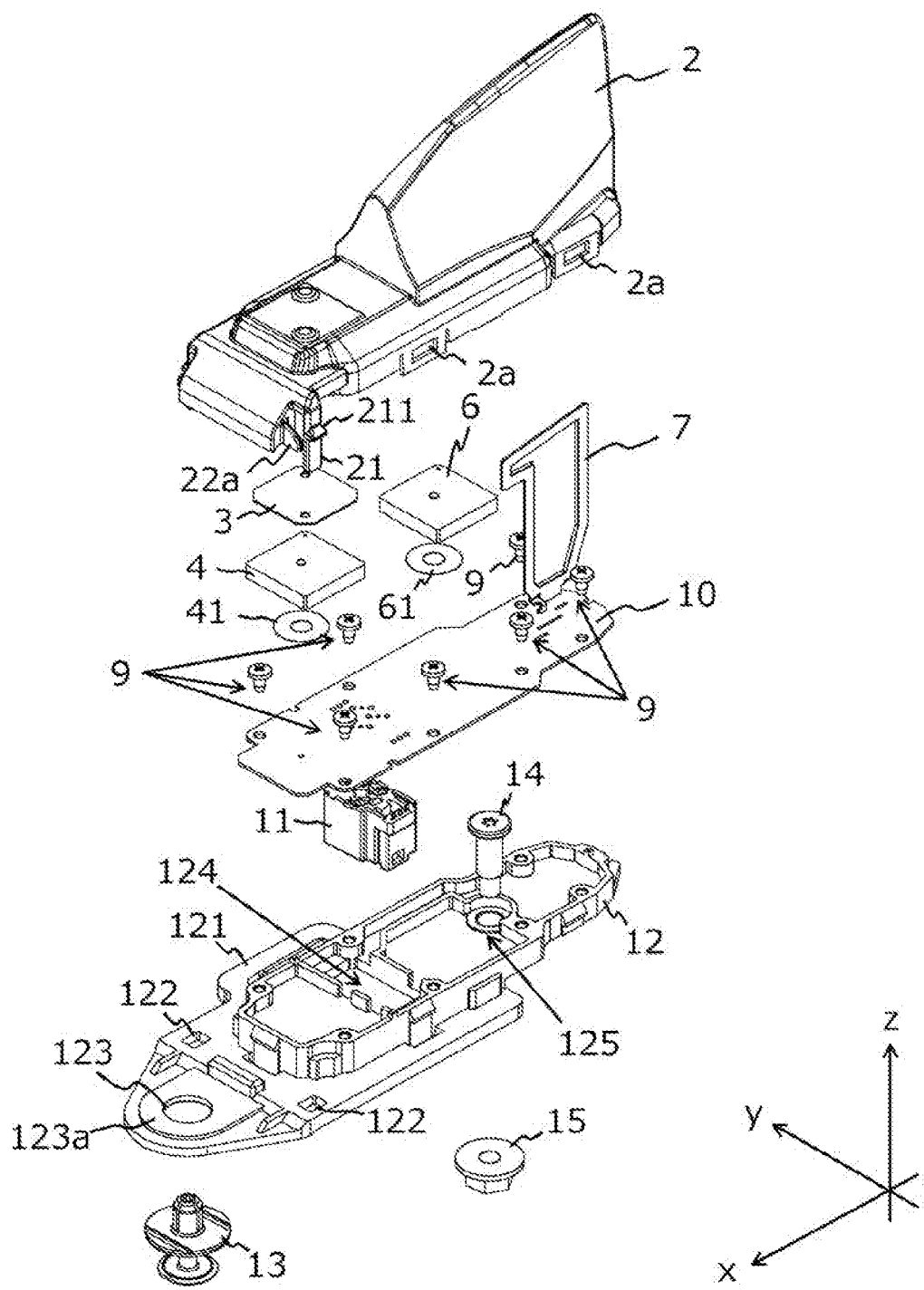
FIG. 3 is a perspective view of each part before the antenna device of the first embodiment is assembled.

As illustrated in FIG. 3, the inner case 2 has a lower surface that is opened, and covers the member configuring the antenna device 1, other than the inner case 2 (the first antenna 4 and the like), from the upper side in the z direction.

Note that, in the first embodiment, the region of the roof 16 that faces the inner case 2 is upraised to the upper side in the z direction, and corresponds to an outer case that covers the inner case 2. For this reason, the antenna device 1 itself does not include a member corresponding to the outer case.

Figure 4:
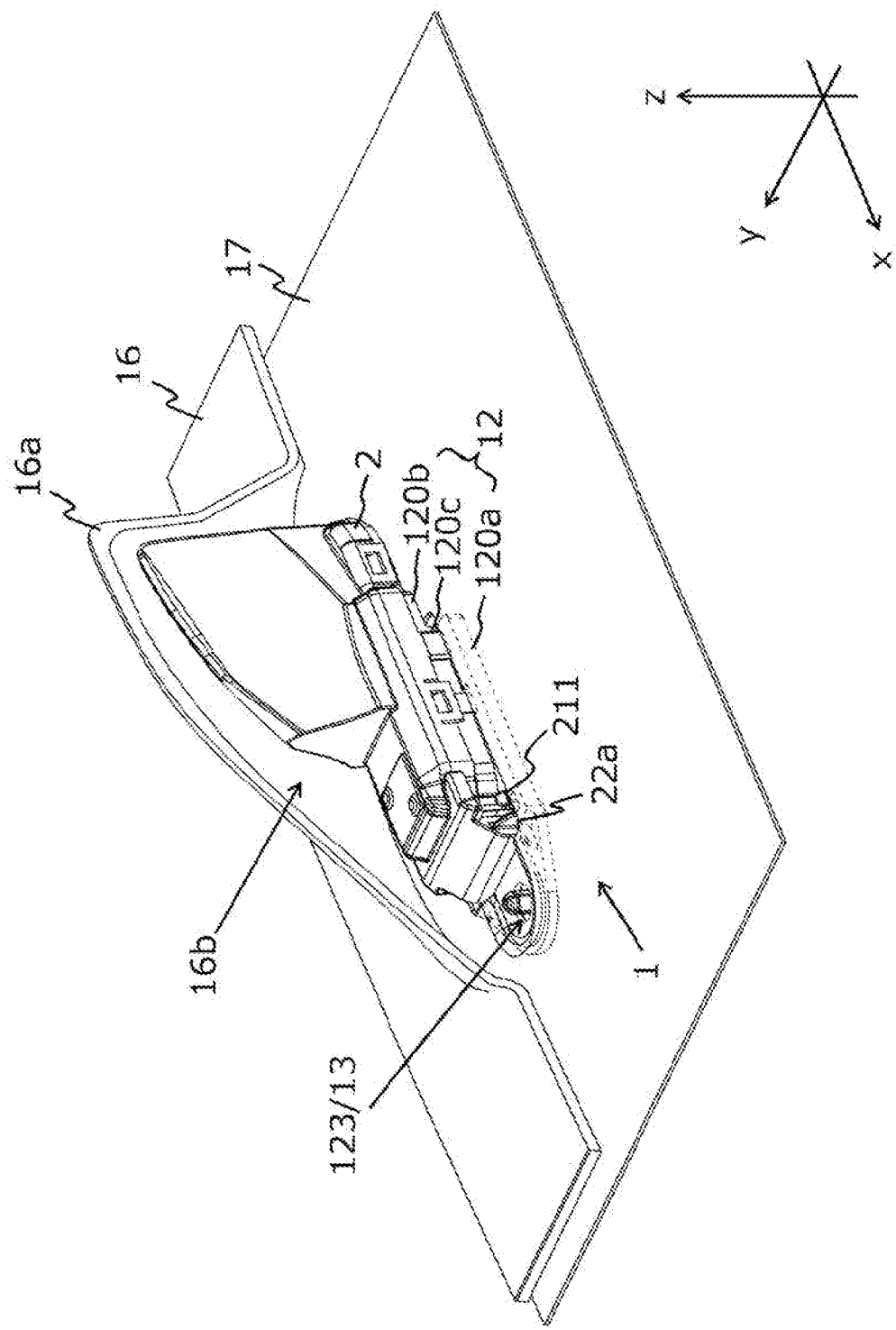
FIG. 4 is a perspective view illustrating a state in which the antenna device of the first embodiment is mounted on an inner panel, from which a part of a roof is cut.
Figure 5:
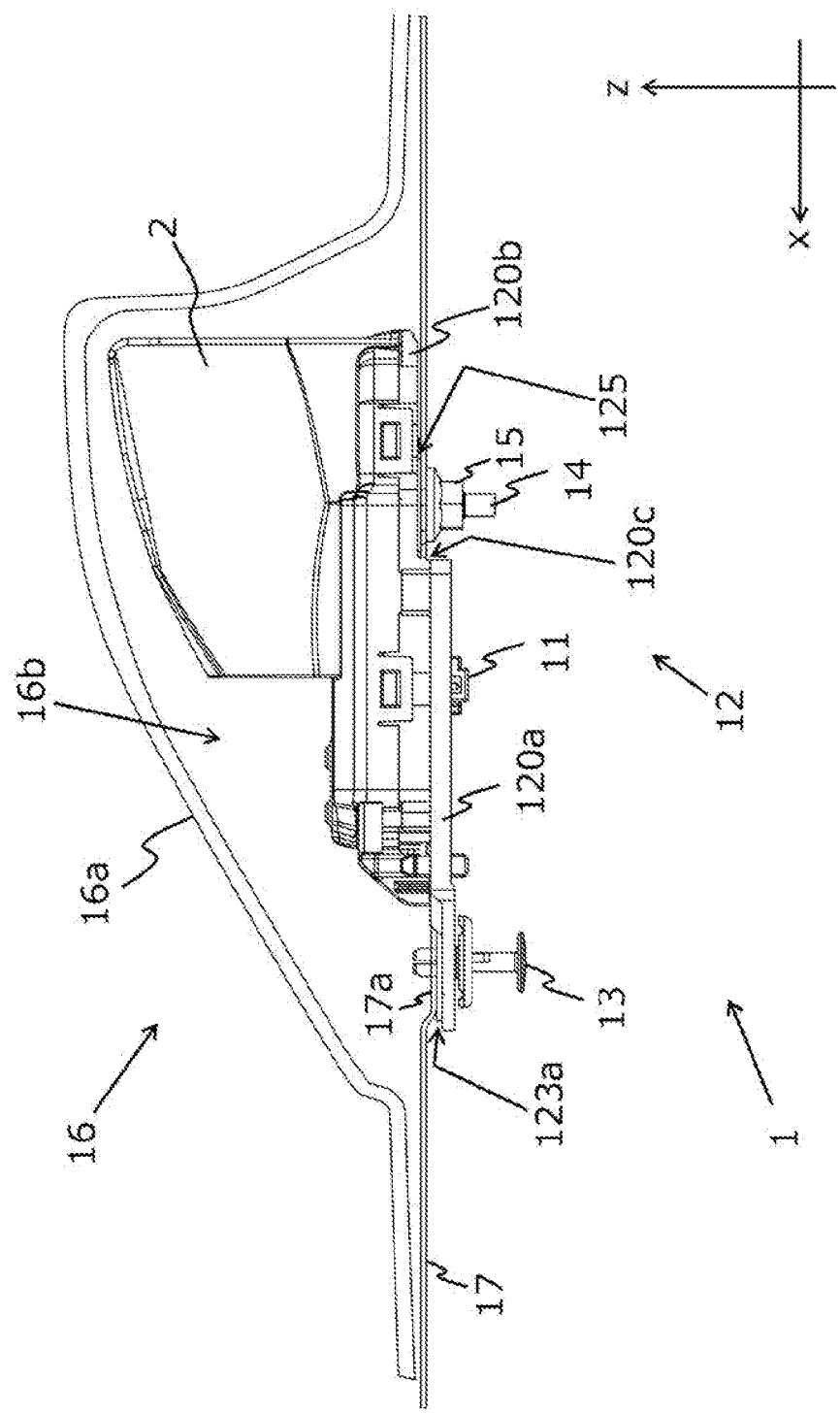
FIG. 5 is a sectional configuration diagram illustrating a state in which the antenna device of the first embodiment is mounted on the inner panel.

As illustrated in FIG. 4 or FIG. 5, a region 16a of the roof 16 that is upraised to the upper side in the z direction, for example, is in the shape of a shark-fin in which the front side in the x direction is inclined to be lower than the rear side in the x direction, and both side surfaces are curved to the inner side.

A first engaging portion 2a for mounting the inner case 2 on the base 12 that is configured of a hole or a claw is provided in a lower peripheral portion of the inner case 2. When the inner case 2 is fixed to the base 12, the first engaging portion 2a is engaged with a second engaging portion 12a that is provided in the upper portion 120b of the base 12.

In the first embodiment, an example is described in which the hole or the claw configuring the first engaging portion 2a is provided in a right side portion or a left side portion of the inner case 2, and the hole or the claw (not illustrated) configuring the first engaging portion 2a is provided on an inner wall of a front portion of the inner case 2.

When seen from the rear side in the x direction, a protruding piece 21 and a first rotation stopper 22a are provided on the left side of the inner case 2 on the front side in the x direction (refer to FIG. 6 to FIG. 9 and FIG. 26 to FIG. 29). The protruding piece 21 is approximately in the shape of a rectangular parallelepiped that extends in the z direction, and protrudes to the lower side in the z direction. The first rotation stopper 22a protrudes to the left side in the y direction on the front side in the x direction from the protruding piece 21, and is approximately in the shape of a triangle when seen from the x direction.

The protruding piece 21 and a second rotation stopper 22b are provided on the right side of the inner case 2 on the front side in the x direction when seen from the rear side in the x direction. The protruding piece 21 is approximately in the shape of a rectangular parallelepiped that extends in the z direction, and protrudes to the lower side in the z direction, as with the protruding piece 21 that is provided on the left side of the inner case 2 on the front side in the x direction. The second rotation stopper 22b protrudes to the right side in the y direction on the front side in the x direction from the protruding piece 21, and is approximately in the shape of a triangle when seen from the x direction.

The protruding piece 21 is a protrusion that is formed such that a tip end portion protrudes to a lower side in the z direction from a protruding piece inserting hole 122 of the base 12 (a lower portion 120a) when the inner case 2 is mounted on the base 12. A force in the y direction is applied to the tip end portion of the protrusion (the protruding piece 21), and thus, it is possible to move the tip end portion of the protruding piece 21 in the y direction.

Holding claws 211 protruding to the outer side in the y direction are respectively provided in the protruding piece 21.

Figure 6:
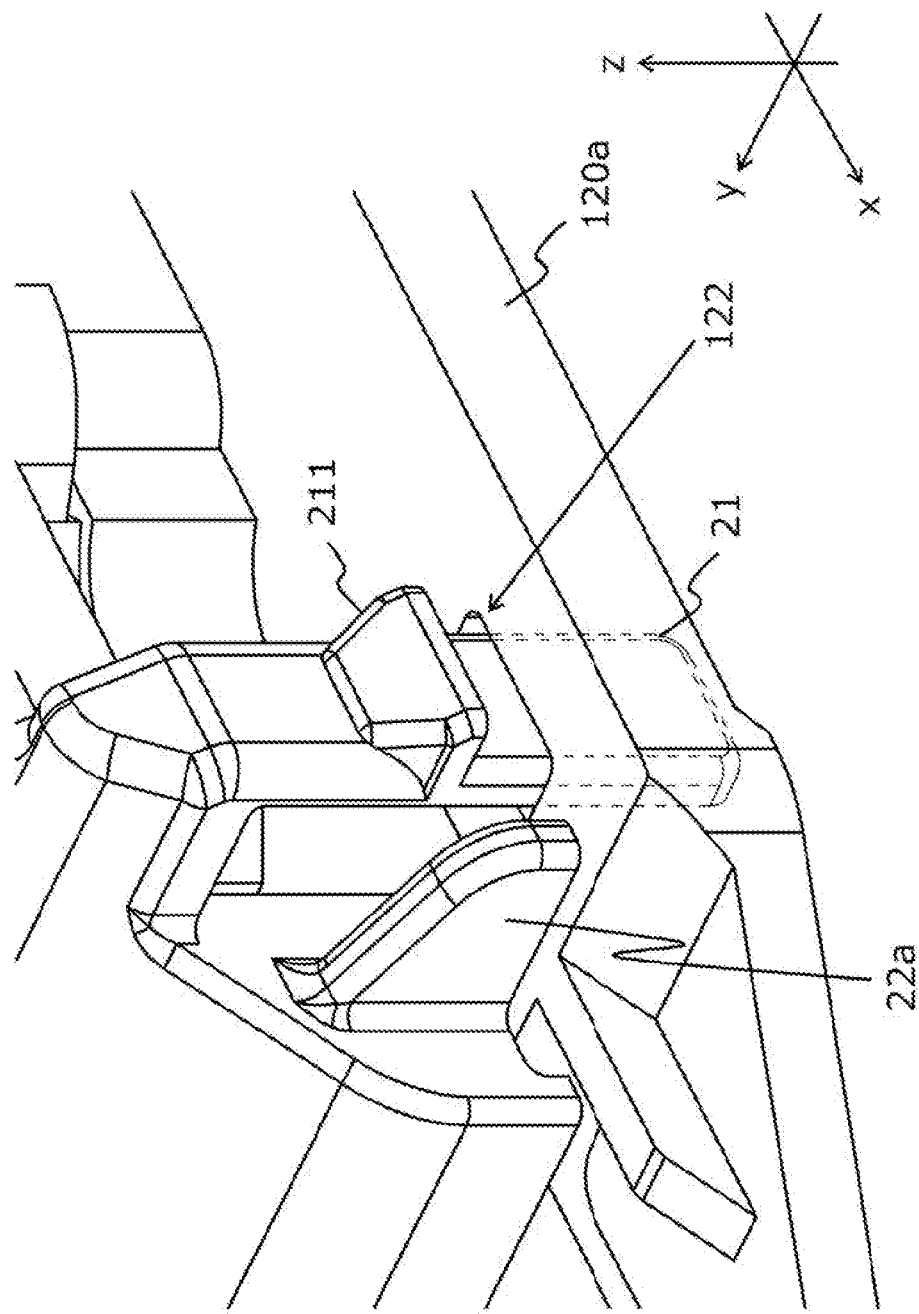
FIG. 6 is a perspective view illustrating a position relationship of a protruding piece, a holding claw, a first rotation stopper, and a base in the first embodiment.
Figure 7:
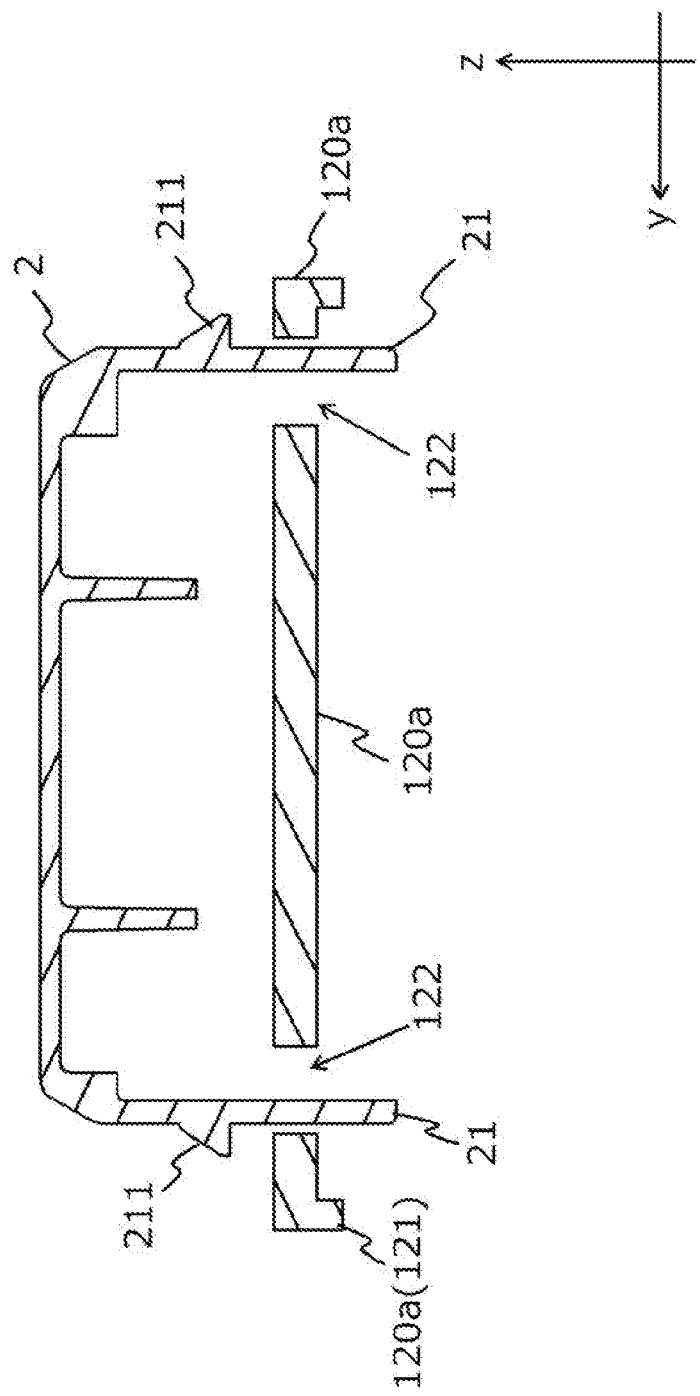
FIG. 7 is a sectional configuration diagram illustrating a position relationship of the protruding piece, the holding claw, and the base in the first embodiment.
Figure 8:
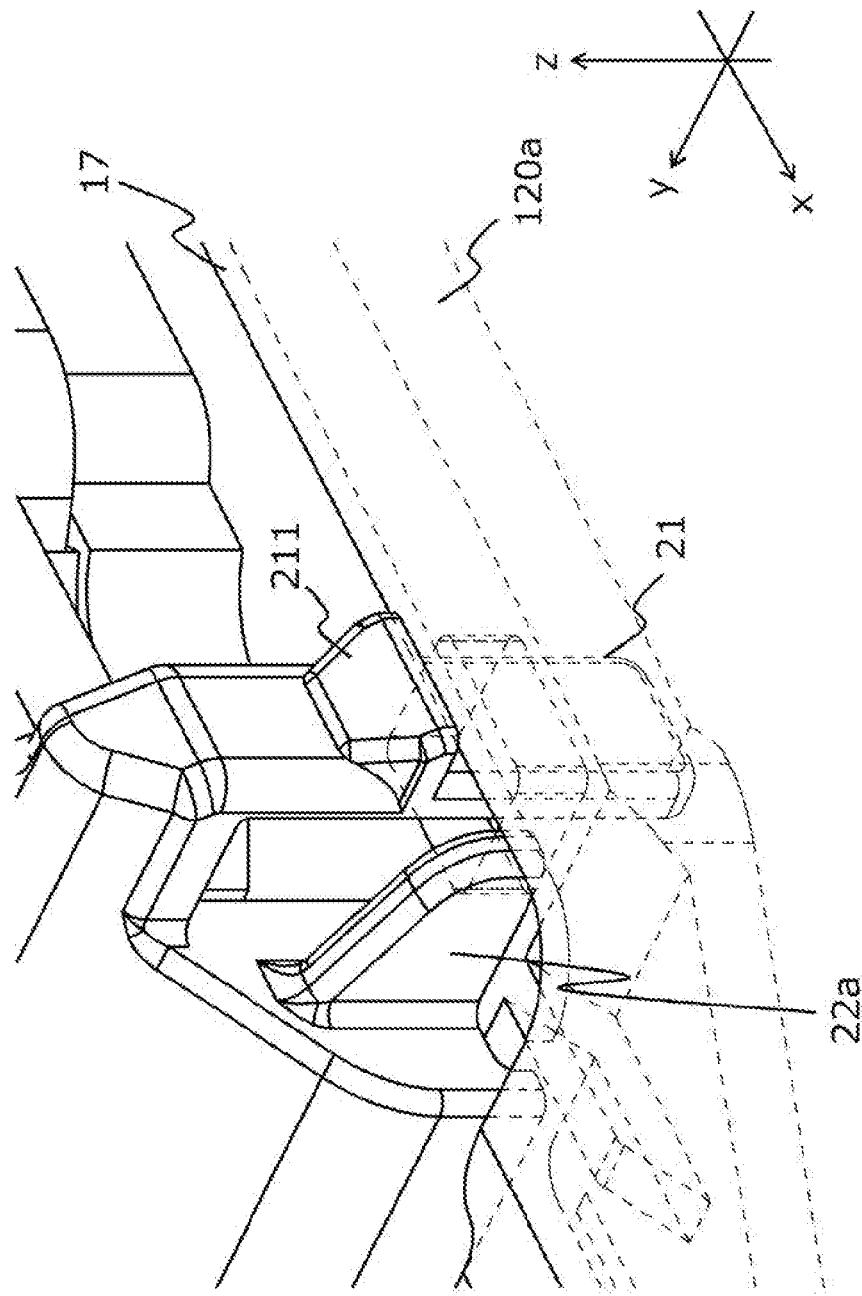
FIG. 8 is a perspective view illustrating a position relationship of the protruding piece, the holding claw, the first rotation stopper, the base, and the inner panel in the first embodiment.
Figure 9:
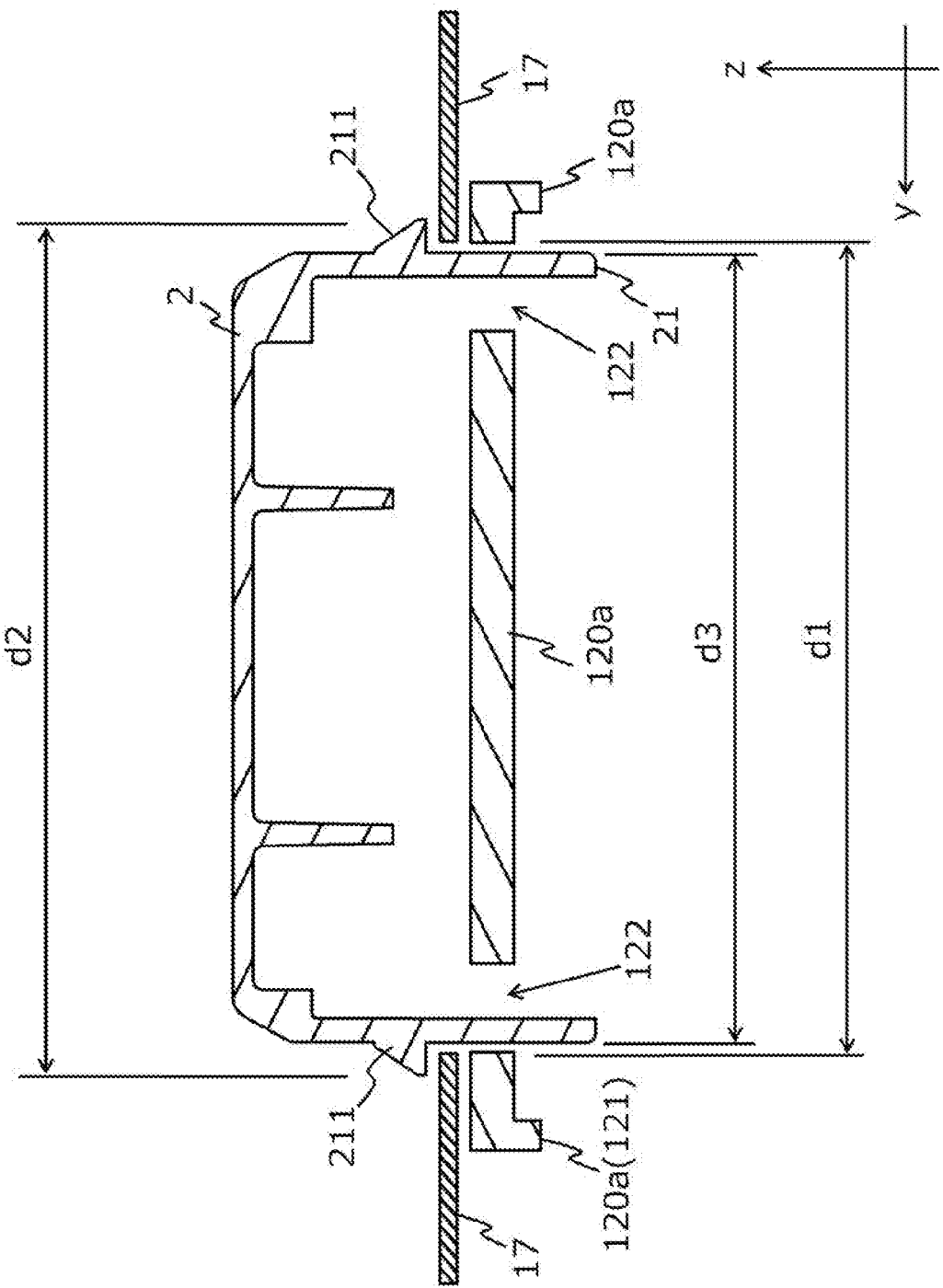
FIG. 9 is a sectional configuration diagram illustrating a position relationship of the protruding piece, the holding claw, the base, and the inner panel in the first embodiment.

As illustrated in FIG. 6 or FIG. 7, the holding claw 211 includes a tapered shape portion that is widened towards the lower side in the z direction and that has a protruding amount increasing towards the lower side in the z direction from the upper side in the z direction. Here, the tapered shape indicates a shape in which the width of a yz sectional surface is widened towards the lower side from the upper side in the z direction. In other words, the holding claw 211 has a shape in which a lower surface is parallel to an upper surface of the lower portion 120a of the base 12 and in which a rectangular shape of the xy sectional surface is widened towards the lower side from the upper side in the z direction. As illustrated in FIG. 8 or FIG. 9, a state in which the inner panel 17 is positioned on the lower side in the z direction from a lower surface of the tapered shape portion is maintained by the holding claw 211. That is, the holding claw 211 is capable of holding the inner panel 17 on the lower side in the z direction from the holding claw 211.

When the antenna device 1 is mounted on the inner panel 17 from the lower side in the z direction, the tapered shape portion of the holding claw 211 is in contact with the inner panel 17, and the holding claw 211 is pushed into the inner side in the y direction. As described above, a lower end of the protruding piece 21 in the z direction is bent to the inner side in the y direction, and the holding claw 211 passes through the inner panel 17. After the holding claw 211 passes through the inner panel 17, the inner panel 17 is disposed between the holding claw 211 and the lower portion 120a of the base 12, and a lower end of the holding claw 211 faces the inner panel 17 in the z direction. Further, from such a state, in a case where the lower end of the protruding piece 21 is bent to the inner side in the y direction and the lower end of the holding claw 211 is in the position relationship of facing the mounting hole 18 in the z direction, it is possible to lower the front side of the antenna device 1 in the x direction to the lower side in the z direction without the holding claw 211 being contact with the inner panel 17. The shape or the like of the holding claw 211 is determined such that such a position relationship of each part is established.

The rotation stopper (the first rotation stopper 22a and the second rotation stopper 22b) is in contact with a boundary region with respect to mounting hole 18 in the inner panel 17, in a state where the antenna device 1 is latched in the inner panel 17 by using the holding claw 211. The shape or the like of the rotation stopper (the first rotation stopper 22a and the second rotation stopper 22b) is determined such that such a position relationship of each part is established.

When the bolt 14 and the nut 15 are fastened, the rotation of the antenna device 1 is prevented by the contact between the first rotation stopper 22a and the inner panel 17, even in a case of applying a fastening force to the antenna device 1.

When the bolt 14 and the nut 15 are loosened, the rotation of the antenna device 1 is prevented by the contact between the second rotation stopper 22b and the inner panel 17.

Figure 29:
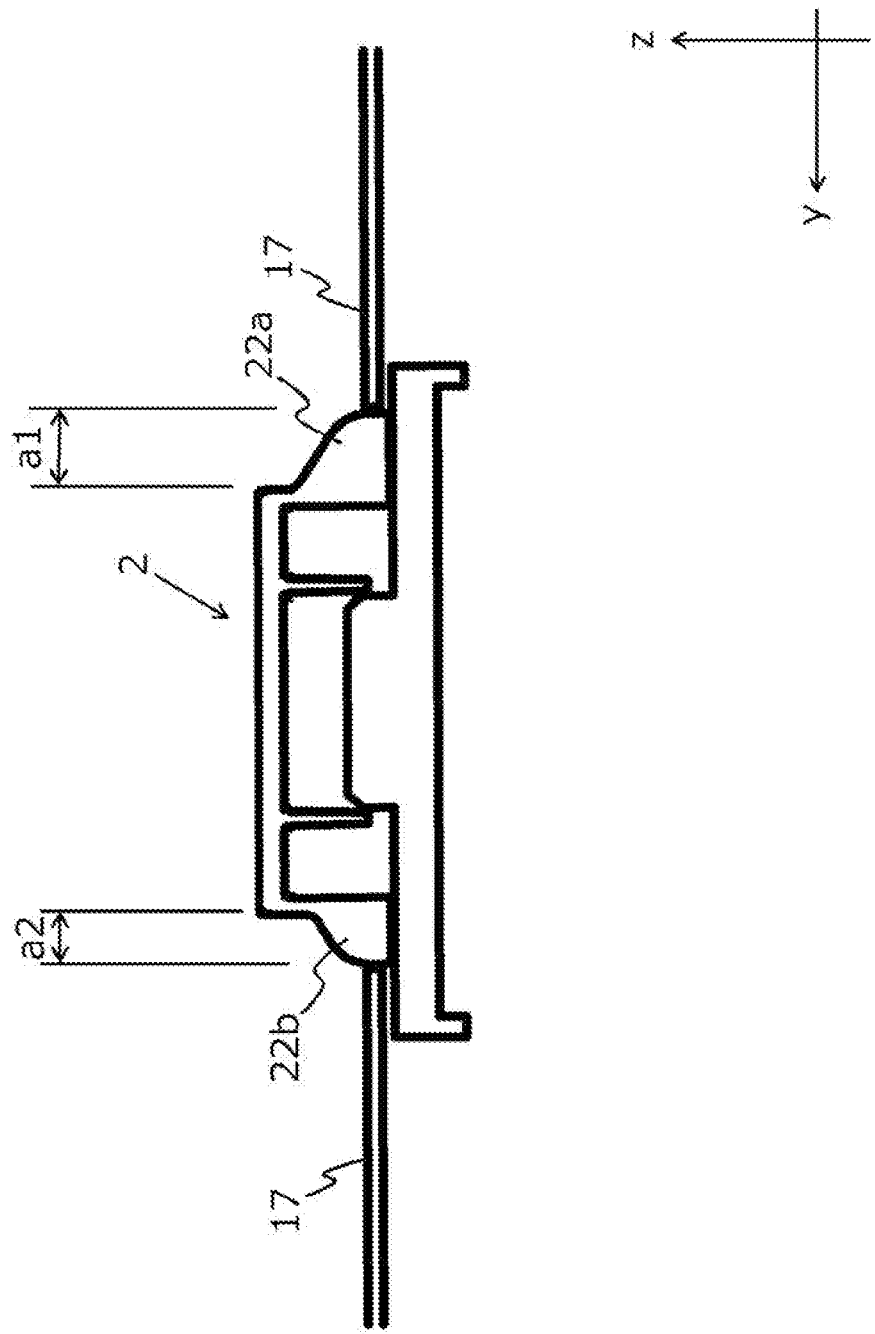
FIG. 29 is a sectional configuration diagram of line A-A of FIG. 28, from which hatching is omitted.

As illustrated in FIG. 29, when seen from the front side in the x direction, a protruding amount a1 of the rotation stopper (the first rotation stopper 22a) to the right side in the y direction that protrudes to the right side in the y direction is greater than a protruding amount a2 of the rotation stopper (the second rotation stopper 22b) to the left side in the y direction that protrudes to the left side in the y direction.

For this reason, in a step where the antenna device 1 is latched in the inner panel 17, the antenna device 1 is disposed in a state where the front side in the x direction is slightly inclined to the right side in the y direction (at approximately 1 degree) when seen from the upper side in the z direction.

However, when the nut 15 is screwed to the bolt 14, a rotating force is also applied to the antenna device 1 in a counterclockwise direction, when seen from the upper side in the z direction. Accordingly, the inclination described above is eliminated, and the antenna device 1 is fixed in a state where a front portion of the antenna device 1 is directed towards a front direction in the x direction.

The parasitic element 3 is positioned on the upper side of the first antenna 4 in the z direction, and is mounted on the inner wall of the inner case 2 (refer to FIG. 3).

Figure 2:
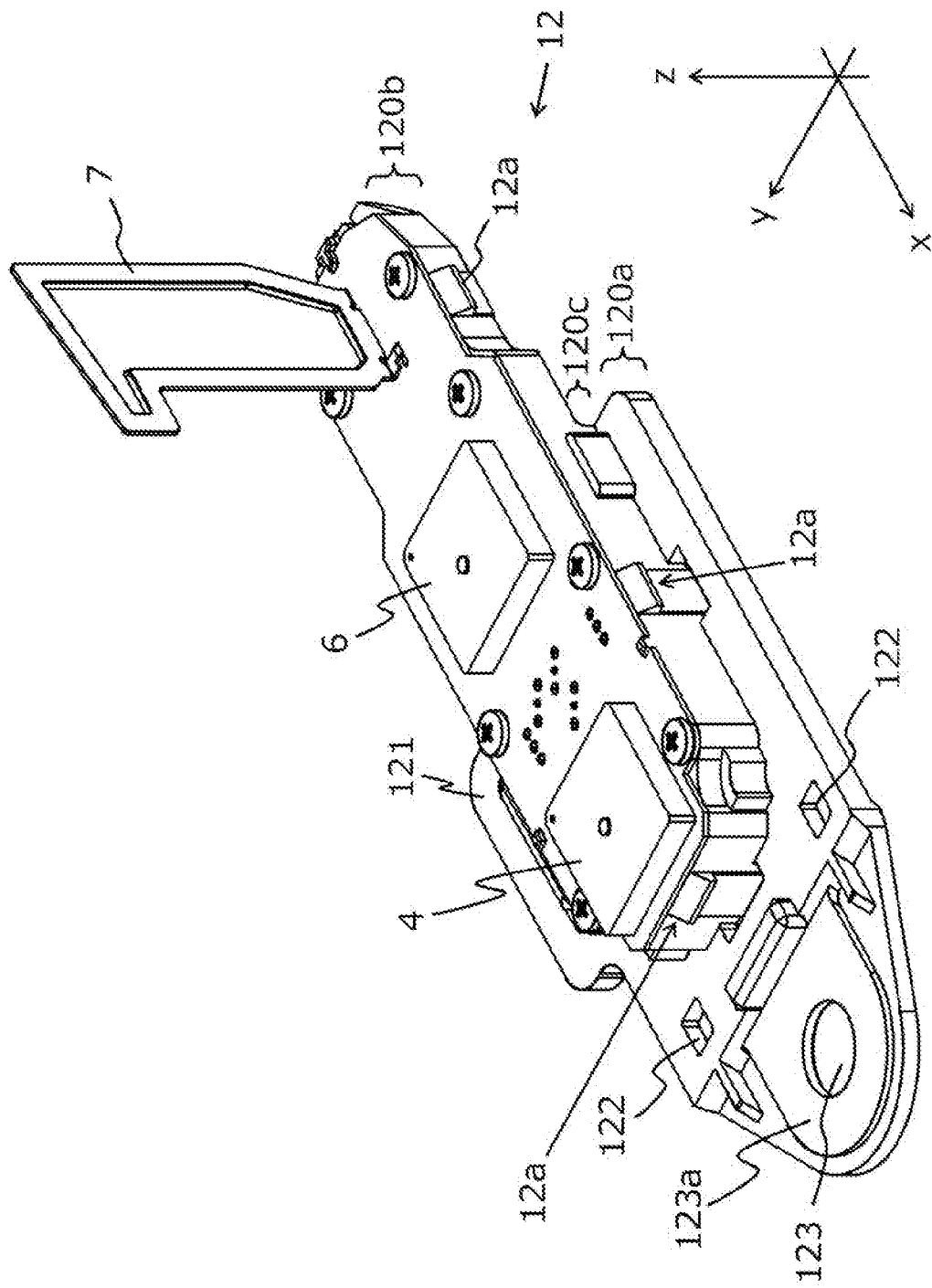
FIG. 2 is a perspective view of the antenna device of the first embodiment, from which an inner case, the nut, and the clip are omitted.

As illustrated in FIG. 2, the first antenna 4 is a planar antenna for receiving satellite digital radio broadcasting such as XM. As illustrated in FIG. 3, the first antenna 4 is mounted on the substrate 10 through the first double-faced tape 41.

The second antenna 6 is a planar antenna for receiving position information (time information) from a satellite, such as a GPS. The second antenna 6 is mounted on the substrate 10 through the second double-faced tape 61.

The third antenna 7 is an antenna for performing communication with respect to a wireless base station of a mobile telephone network. The third antenna 7 is erected on the substrate 10.

The mounting screw 9 is used for mounting the substrate 10 on the base 12.

An electronic component (not illustrated) such as an amplifier is provided on a lower surface of the substrate 10.

Mounting holes of the mounting screw 9 that are provided on the substrate 10 and base 12 are provided in four places on the front side in the x direction and three places on the rear side in the x direction.

A line for connecting the third antenna 7 and the connector 11 on the substrate 10 is disposed in a region where the mounting hole of the mounting screw 9 is not provided. Specifically, the line on the substrate 10 for connecting the third antenna 7 and the connector 11 is disposed in a region on the right side in the y direction when seen from the rear side in the x direction, and on the rear side in the x direction.

The connector 11 is used for electric connection between the first antenna 4, the second antenna 6, the third antenna 7, and the substrate 10, and an electronic device on the vehicle side, such as a car navigation system. The connector 11 is mounted on a lower portion of the substrate 10 such that a lower end protrudes to the lower side in the z direction from the lower portion 120a of the base 12.

The base 12 is formed of a metal, and is configured of the lower portion 120a, the upper portion 120b, and a connecting portion 120c. The lower portion 120a is positioned on the lower side in the z direction from the inner panel 17 of the vehicle. The upper portion 120b is positioned on the upper side in the z direction from the lower portion 120a. The connecting portion 120c is positioned at the same height in the z direction as that of the inner panel 17, and connects the lower portion 120a and the upper portion 120b.

The lower portion 120a has a shape in which a protruding portion 121 is integrally provided on a plate of which an xy sectional surface is approximately in the shape of a pentagon. The protruding portion 121 protrudes to the right side in the y direction when seen from the rear side in the x direction, and is configured of a plate of which an xy sectional surface is approximately in the shape of a rectangle.

The protruding piece inserting hole 122 and a first clip inserting hole 123 are provided in the lower portion 120a. The protruding piece inserting holes 122 are positioned on right and left ends on the front side in the x direction, and the protruding pieces 21 of the inner case 2 pass therethrough. As illustrated in FIG. 1, the first clip inserting hole 123 is positioned on the front side in the x direction from the protruding piece 21. As illustrated in FIG. 4, the clip 13 is inserted into the first clip inserting hole 123.

In order to easily inserting the clip 13, it is desirable that the first clip inserting hole 123 has a diameter greater than that of a second clip inserting hole 182 provided on the inner panel 17, described below.

As illustrated in FIG. 9, the length of the protruding piece inserting hole 122 in the y direction (a hole width) is greater than the length of the protruding piece 21 in the y direction.

In addition, in a state where the protruding piece 21 is inserted into the protruding piece inserting hole 122, one protruding piece 21 can be bent to be close to the other protruding piece 21, or the other protruding piece 21 can be bent to be close to one protruding piece 21, by pinching the protruding pieces 21 with fingers. The protruding piece inserting hole 122 is formed in the lower portion 120a of the base 12 such that such a position relationship of each part is established.

For this reason, it is possible to simply release the fixed state between the antenna device 1 and the inner panel 17 by the holding claw 211 provided in the protruding piece 21.

As illustrated in FIG. 2, the second engaging portion 12a that is engaged with the first engaging portion 2a of the inner case 2 is provided on a lateral surface of the upper portion 120b. As illustrated in FIG. 3, the substrate 10 is mounted on an upper surface of the upper portion 120b by the screwing of the mounting screw 9.

The base 12 is configured such that a front portion of the lower portion 120a protrudes to the front side in the x direction from the upper portion 120b, and a rear portion of the upper portion 120b protrudes to the rear side in the x direction from the lower portion 120a. The front portion of the lower portion 120a is a portion in which the protruding piece inserting hole 122 and the first clip inserting hole 123 of the lower portion 120a are provided.

In addition, the dimension or the like of the base 12 is determined such that the length of at least a part of the lower portion 120a of the base 12 in a predetermined direction is greater than the length of the mounting hole 18 in the predetermined direction.

Figure 17:
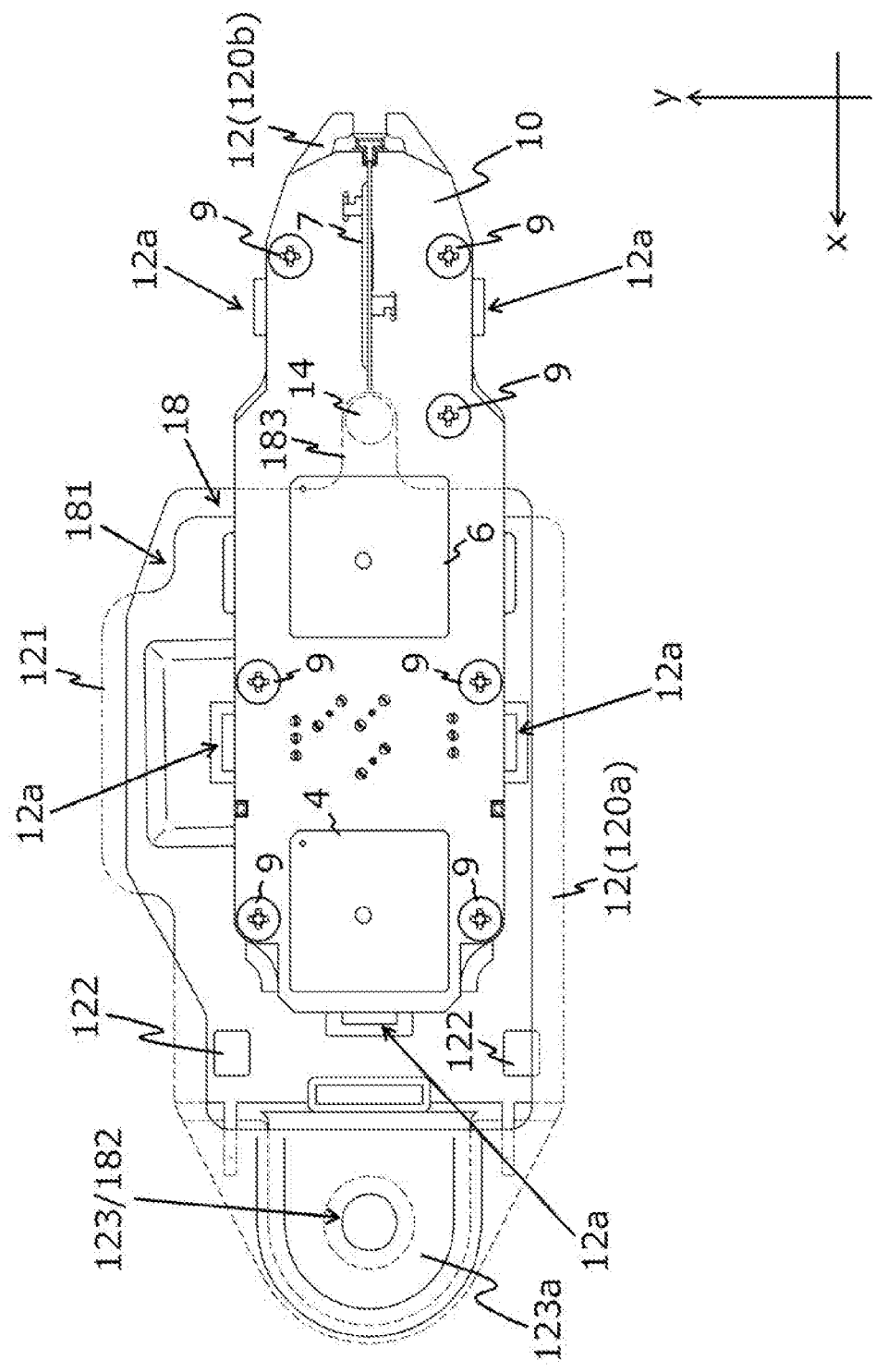
FIG. 17 is a diagram of the antenna device mounted on the inner panel of the first embodiment, seen from the top, from which the inner case, the nut, and the clip are omitted.

Specifically, in the first embodiment, as illustrated in FIG. 17, the base 12 and the mounting hole 18 are configured such that the length of the lower portion 120a is greater than the length of the mounting hole 18 in both of the x direction and the y direction, in most regions.

In addition, it is desirable that the base 12 and the mounting hole 18 are configured such that a gap is not generated between the lower portion 120a of the base 12 and the mounting hole 18 when seen from the z direction. It is possible to suppress a variation in electronic performance when the antenna device 1 is mounted on the inner panel 17.

As illustrated in FIG. 5, a circumference 123a of the first clip inserting hole 123 in the lower portion 120a is in contact with a front adjacent portion 17a. The front adjacent portion 17a is a region that is adjacent to the front side of the mounting hole 18 in the x direction, in the inner panel 17. The circumference of a bolt holding hole 125 in the upper portion 120b is in contact with a peripheral region 17b of a cutout 183. The other regions in the base 12 are not in contact with the inner panel 17. A position relationship and the dimension of each part are determined such that above described contact condition of the base 12 and the inner panel 17 is established.

Accordingly, a region that is the lower portion 120a of the base 12 and is a region other than the circumference 123a of the first clip inserting hole 123 is not in contact with the lower surface of the inner panel 17.

In addition, a region that is the upper portion 120b of the base 12 and is a region other than the circumference of the bolt holding hole 125 is not in contact with the upper surface of the inner panel 17.

Accordingly, it is possible to prevent the base 12 and the inner panel 17 from being in electrically contact with regions other than predetermined positions. Therefore, it is possible to suppress a variation in the electronic performance when the antenna device 1 is mounted on the inner panel 17. Here, the predetermined positions are portions in which the circumference of the bolt holding hole 125, the bolt 14, the nut 15, the circumference 123a of the first clip inserting hole 123, and the rotation stopper (the first rotation stopper 22a and the second rotation stopper 22b) are provided.

In addition, in the predetermined positions described above, electric connection (ground connection) between the base 12 and the inner panel 17 can be made through the circumference of the bolt holding hole 125, the bolt 14, the nut 15, and the peripheral region 17b of the cutout 183.

As illustrated in FIG. 3, a connector inserting hole 124 is provided in a central portion of the base 12. The connector inserting hole 124 penetrates through the lower portion 120a, the upper portion 120b, and the connecting portion 120c in the z direction, and holds the connector 11. The bolt holding hole 125 is provided on the rear side in the x direction from the connector inserting hole 124 in the upper portion 120b. The bolt 14 is inserted into the bolt holding hole 125 from the upper side in the z direction, and thus, the bolt holding hole 125 holds a head portion of the bolt 14.

The circumference of the bolt holding hole 125 protrudes to the lower side in the z direction from the other regions in the upper portion 120b, and is in contact with the upper surface of the inner panel 17.

Figure 12:
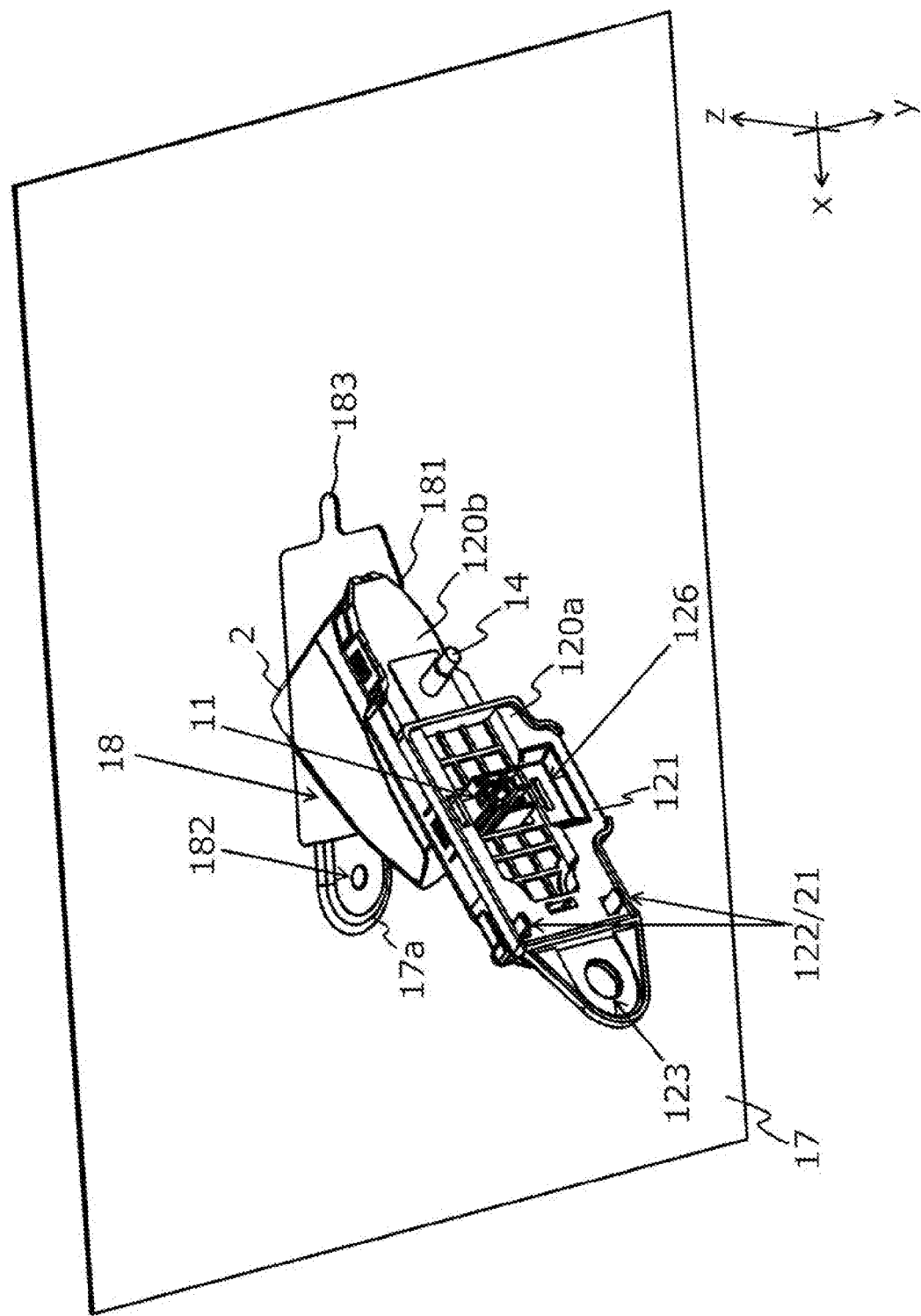
FIG. 12 is a perspective view of the first state in the first embodiment.
Figure 14:
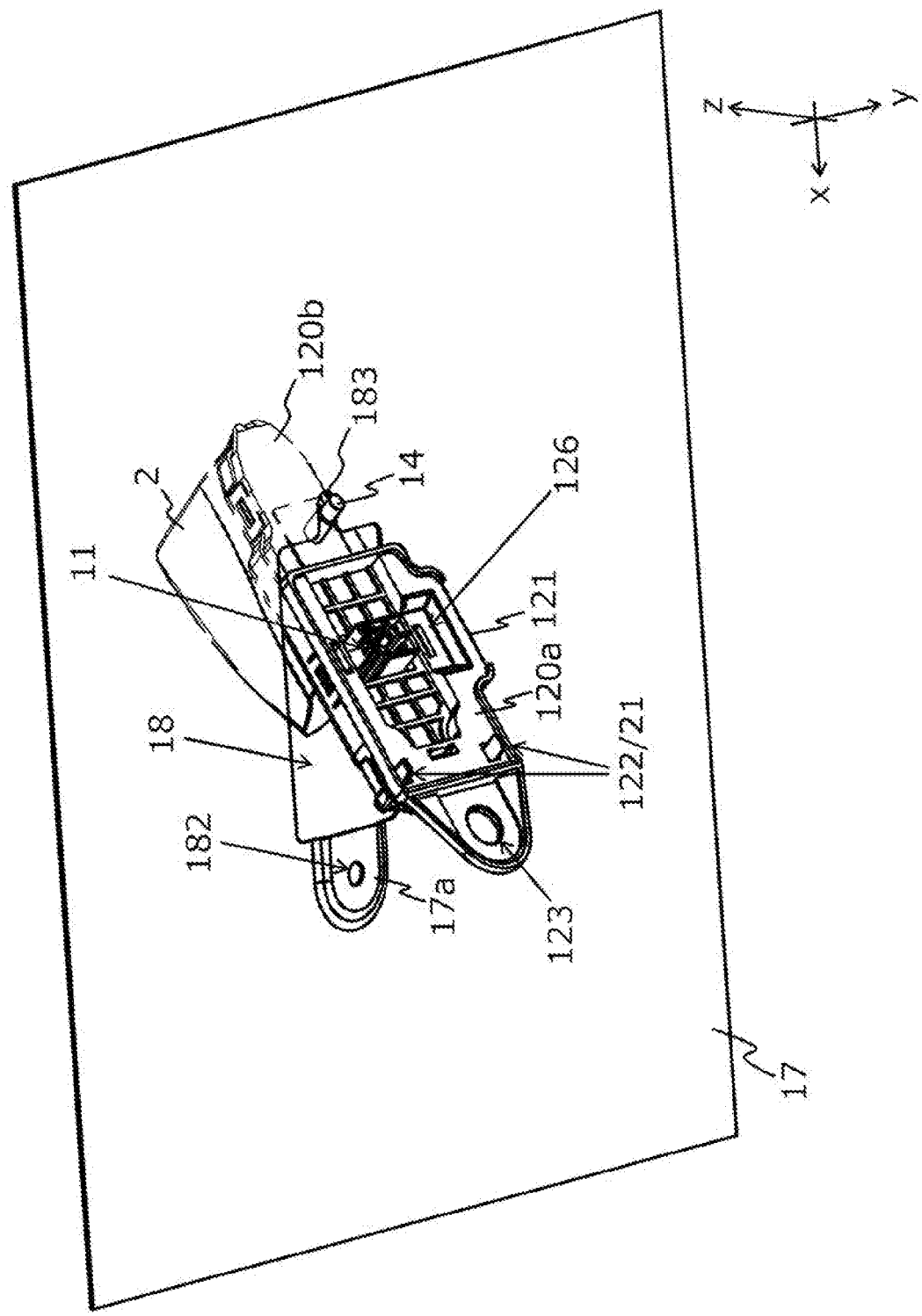
FIG. 14 is a perspective view of the second state in the first embodiment.
Figure 16:
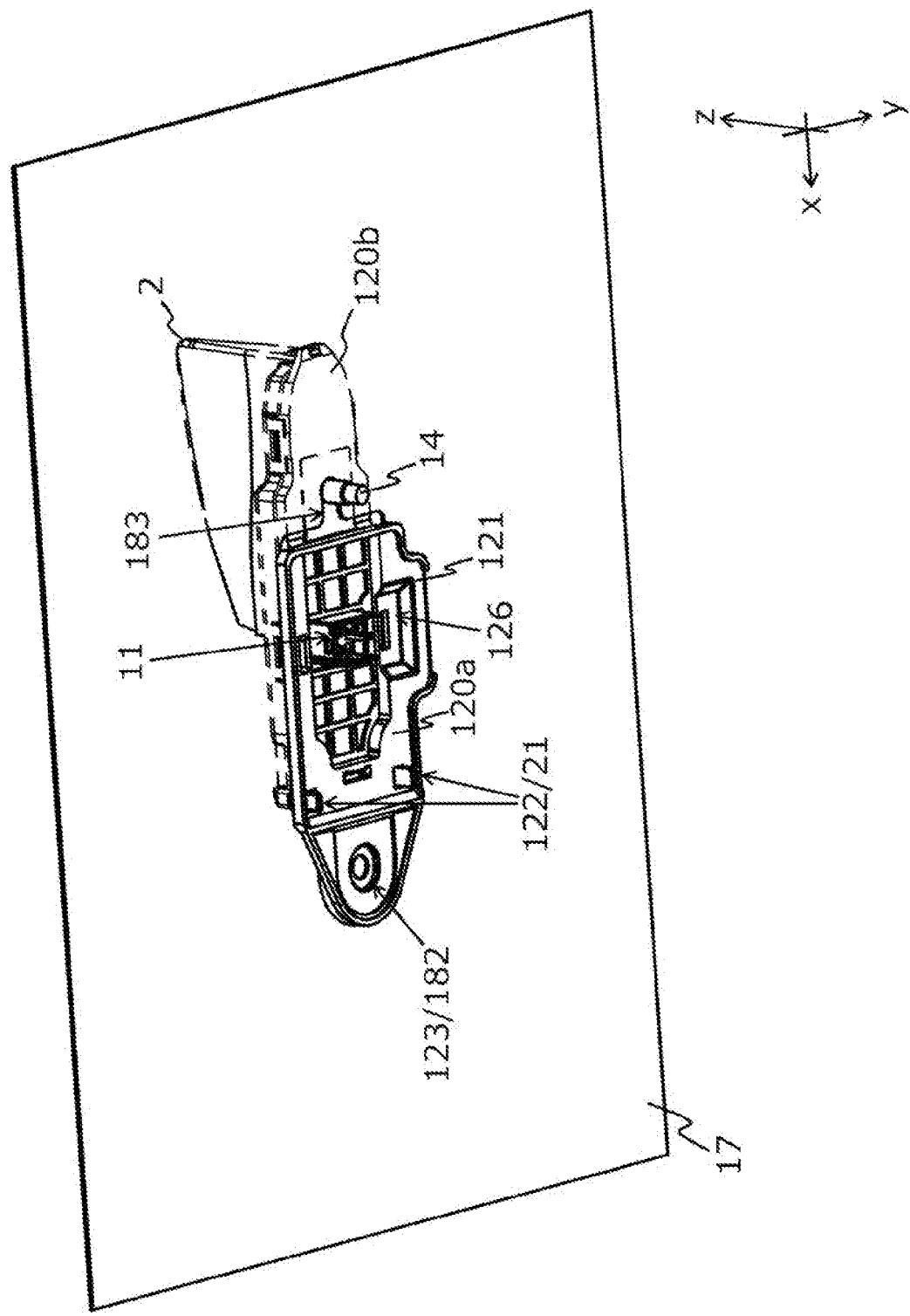
FIG. 16 is a perspective view of the third state in the first embodiment.

A recessed portion 126 is provided in the region that is in contact with the protruding portion 121 and in the lower surface of the protruding portion 121, in (the lower portion 120a of) the base 12 (refer to FIG. 12, FIG. 14, and FIG. 16). The recessed portion 126 is used for containing a part of a cable that extends from the connector 11.

The clip 13 passes through the first clip inserting hole 123 and the second clip inserting hole 182 from the lower side in the z direction (refer to FIG. 3). The first clip inserting hole 123 is provided in the lower portion 120a of the base 12. The second clip inserting hole 182 is provided on the inner panel 17. The clip 13 is used for fixing the lower portion 120a of the base 12 and the inner panel 17 on the front side in the x direction.

The bolt 14 passes through the bolt holding hole 125 that is provided in the upper portion 120b of the base 12, and the cutout 183 from the upper side in the z direction. The bolt 14 is screwed to the nut 15. The bolt 14 is used for fixing (the upper portion 120b of) the base 12 and the inner panel 17 on the rear side in the x direction.

In addition, when the antenna device 1 is mounted on the inner panel 17, a shaft portion of the bolt 14 is inserted into the cutout 183 of the inner panel 17. For this reason, the bolt 14 is also used as a positioning member for mounting the antenna device 1 on the inner panel 17 at a suitable position (refer to FIG. 14). Note that, the shaft portion of the bolt 14 is a region that extends to the lower side in the z direction from the base 12, in the bolt 14.

Next, an assembly procedure of the antenna device 1 will be described.

The first antenna 4 is mounted on the substrate 10 through the first double-faced tape 41.

The second antenna 6 is mounted on the substrate 10 through the second double-faced tape 61.

The third antenna 7 is mounted on the substrate 10 by soldering or the like.

Specifically, the lower end of the third antenna 7 is inserted into the hole of the substrate 10. Next, a region that protrudes to the lower side in the z direction from the substrate 10 on the lower end of the third antenna 7 is twisted the lower surface of the substrate 10. After that, soldering is performed.

The connector 11 is inserted into the connector inserting hole 124, and the bolt 14 is inserted into the bolt holding hole 125, from the upper side in the z direction. In such a state, the substrate 10 is mounted on the base 12 by using the mounting screw 9.

The parasitic element 3 is mounted on the upper surface of the inner wall of the inner case 2.

The inner case 2 is mounted on the upper portion of the base 12 by the engagement between the first engaging portion 2a and the second engaging portion 12a.

At this time, the protruding piece 21 of the inner case 2 is inserted into the protruding piece inserting hole 122 that is provided in the lower portion 120a of the base 12.

The antenna device 1 is fixed to the inner panel 17 through the holding claw 211, and then, the clip 13 is inserted into the first clip inserting hole 123 and the second clip inserting hole 182. In addition, the nut 15 is screwed to the bolt 14.

The inner panel 17 is a metal plate that is provided on the vehicle interior side from the roof 16 of the vehicle. The mounting hole 18 that is approximately in the shape of a rectangle is provided on the inner panel 17. The mounting hole 18 is provided in a region facing in the z direction to the region 16a of the roof 16 upraised to the upper side in the z direction. The region 16a is formed of a synthetic resin or the like having electric wave permeability.

Figure 15:
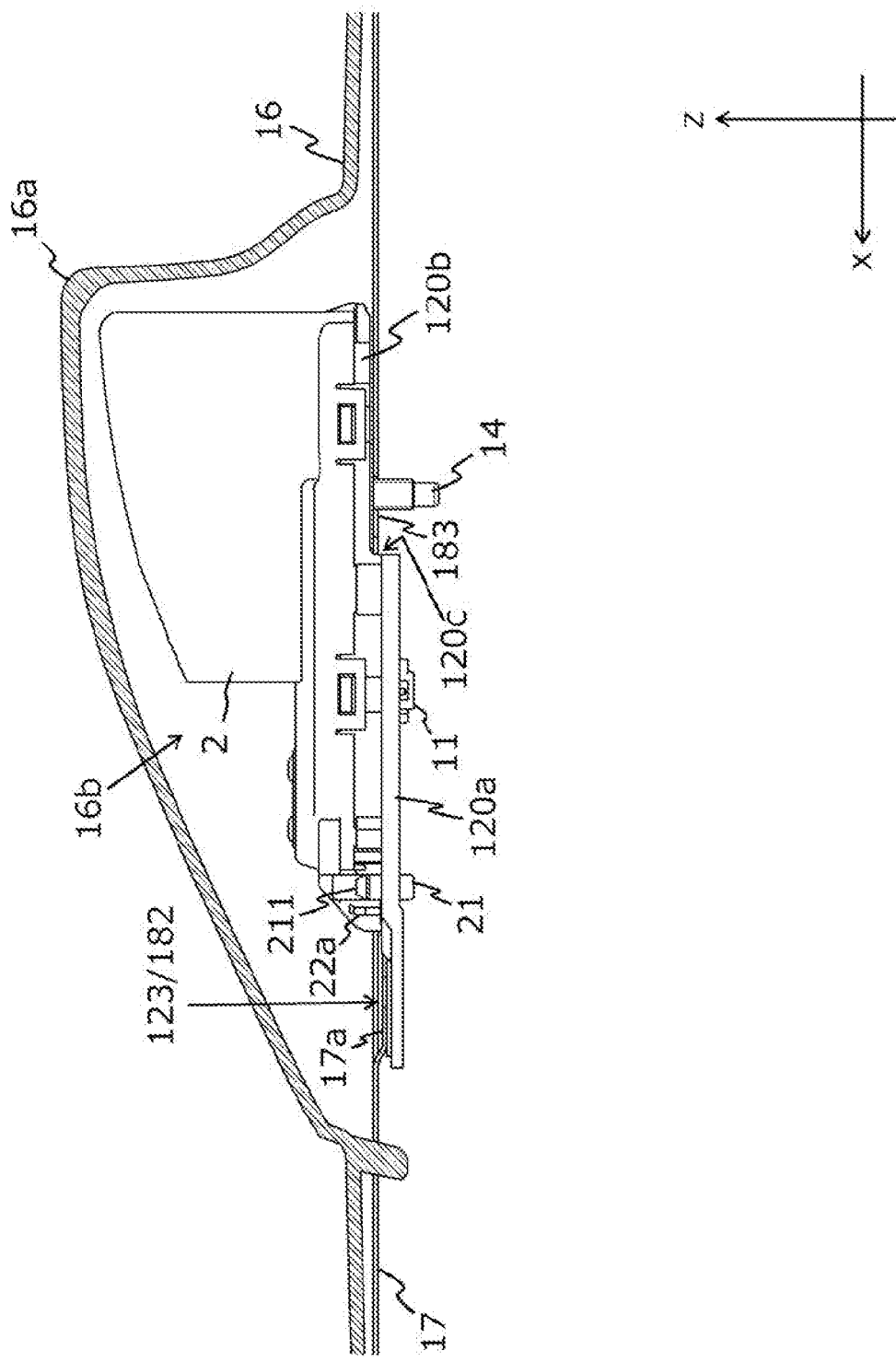
FIG. 15 is a sectional configuration diagram of a third state in the first embodiment.

As illustrated in FIG. 15, at least a part of the antenna device 1 (the upper portion 120b of the base 12, or the like) is contained in a space 16b. The space 16b is formed between the region 16a of the roof 16 that is upraised to the upper side in the z direction and the inner panel 17. As illustrated in FIG. 11 to FIG. 14, at least a part of the antenna device 1 is contained in the space 16b by being inserted from the lower side in the z direction through the mounting hole 18.

Figure 10:
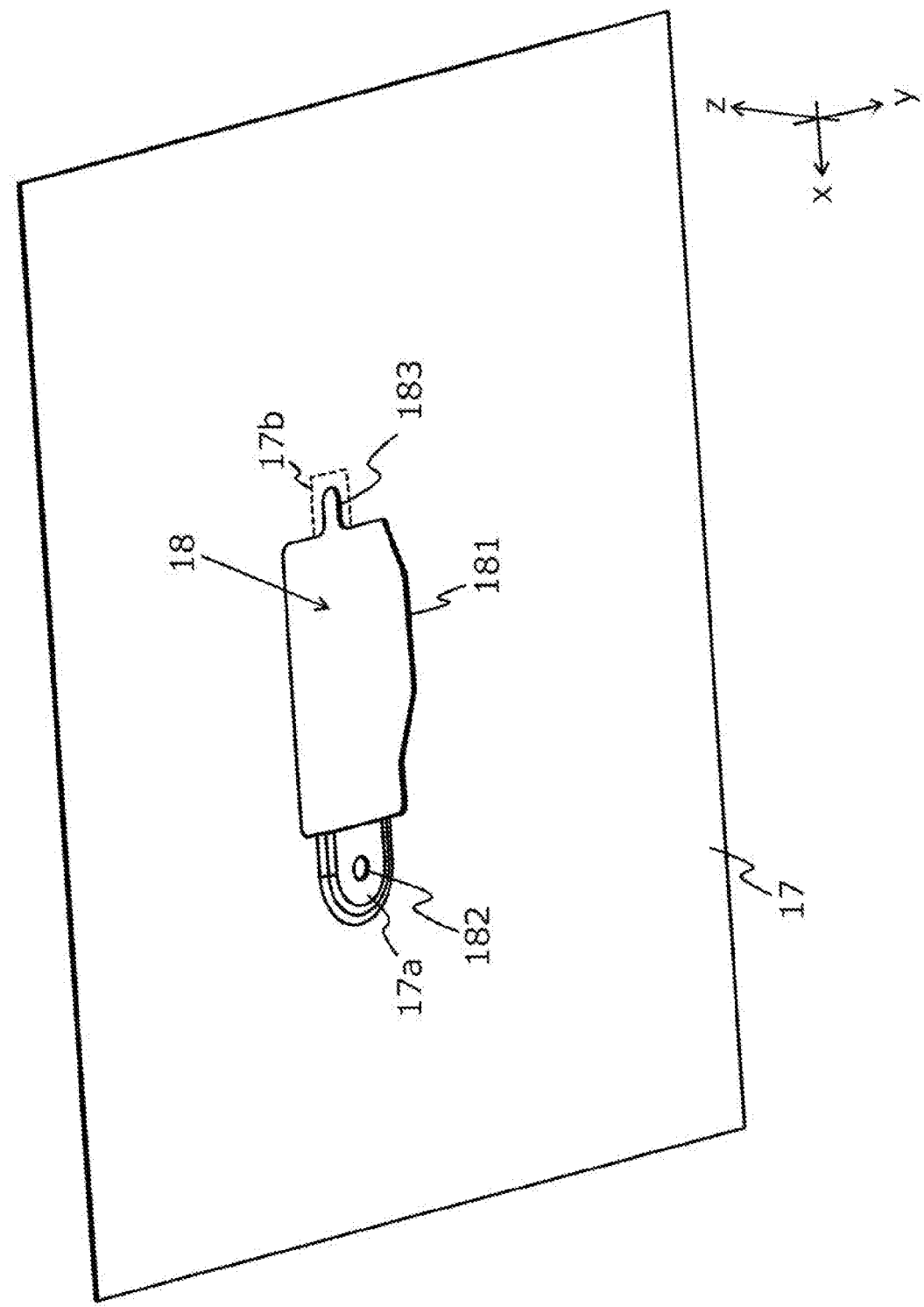
FIG. 10 is a perspective view of a region of the inner panel of the first embodiment in which a mounting hole is provided.

As illustrated in FIG. 10, a hole portion 181 and the cutout 183 are adjacently integrally formed in the mounting hole 18. The hole portion 181 is approximately in the shape of a quadrangle (for example, a trapezoid) that protrudes to the right side in the y direction when seen from the rear side in the x direction. The cutout 183 extends to the rear side in the x direction from the vicinity of the center of the mounting hole 18 in the y direction.

As illustrated in FIG. 17, when the antenna device 1 is mounted on the inner panel 17, the hole portion 181 is provided in a position facing the protruding portion 121 in the lower portion 120a of the base 12 in the z direction. When the antenna device 1 is inserted to the mounting hole 18 from the lower side in the z direction, the hole portion 181 is also used for guiding the direction such that the direction is not mistaken.

In addition, the hole portion 181 is provided, and thus, it is possible to decrease a region in which the protruding portion 121 overlaps the inner panel 17 when seen from the z direction, compared to a case where the hole portion 181 is not provided. Accordingly, the contact between the protruding portion 121 and the inner panel 17 can be less likely to occur.

The cutout 183 is formed into the shape of a slit having a width in the y direction such that the shaft portion of the bolt 14 is fitted. When the antenna device 1 is inserted into the mounting hole 18 from the lower side in the z direction, the shaft portion of the bolt 14 is fitted into the cutout 183.

As illustrated in FIG. 9, the dimension in the y direction (a first distance d1) of the region of the mounting hole 18 in which the holding claws 211 are retained is less than a second distance d2, in a state where one protruding piece 21 and the other protruding piece 21 are not bent. The second distance d2 is the distance between a portion protruding to the outer side of one holding claw 211 in the y direction and a portion protruding to the outer side of the other holding claw 211 in the y direction. In addition, the first distance d1 is greater than the distance between the portion protruding to the outer side of one holding claw 211 in the y direction and the portion protruding to the outer side of the other holding claw 211 in the y direction, in a state where one protruding piece 21 and the other protruding piece 21 are bent to be close to each other. In addition, the first distance d1 is greater than or equal to a third distance d3, in a state where one protruding piece 21 and the other protruding piece 21 are not bent. The third distance d3 is a distance between an outer surface of one protruding piece 21 in the y direction and an outer surface of the other protruding piece in the y direction. The dimension or the like of the mounting hole 18 and the holding claw 211 is determined such that such a position relationship of each part is established (d2>d1≥d3).

The front adjacent portion 17a of the inner panel 17 has a shape that is recessed to the lower side in the z direction from the other regions. The second clip inserting hole 182 is provided in the front adjacent portion 17a (refer to FIG. 10).

A region in the inner panel 17 that is contact with the nut 15, for example, the peripheral region 17b of the cutout 183 is not subjected to coating in order to reliably make electric connection between the nut 15 and the inner panel 17. In FIG. 10, the peripheral region 17b is illustrated as a region surrounded by a dotted line and the cutout 183. In FIG. 12, FIG. 14, and FIG. 16, the dotted line representing the boundary of the peripheral region 17b is not illustrated.

A region of the inner panel 17 other than the peripheral region 17b of the cutout 183 in which the antenna device 1 is mounted is subjected to the coating.

The antenna device 1 is mounted between the roof 16 and the inner panel 17 of the vehicle.

Specifically, the connecting portion 120c of the base 12 is positioned approximately at the same height as that of the inner panel 17. A member positioned on the upper side in the z direction from the connecting portion 120c, such as the upper portion 120b, is disposed under the region 16a of the roof 16 upraised to the upper side in the z direction, and is disposed over the inner panel 17. A member positioned on the lower side in the z direction from the connecting portion 120c, such as the lower portion 120a, is disposed under the inner panel 17.

The bolt 14 extending to the lower side in the z direction from the bolt holding hole 125 in the upper portion 120b of the base 12 of the antenna device 1 is hung over the cutout 183 of the inner panel 17, on the rear side in the x direction.

The holding claws 211 of the protruding piece 21 of the inner case 2 are hung over both ends of a boundary region in the y direction with respect to the mounting hole 18 in the inner panel 17 from the lower side in the z direction, on the front side in the x direction.

Next, the procedure of fixing the antenna device 1 to the inner panel 17 in the first embodiment will be described in detail.

Figure 11:
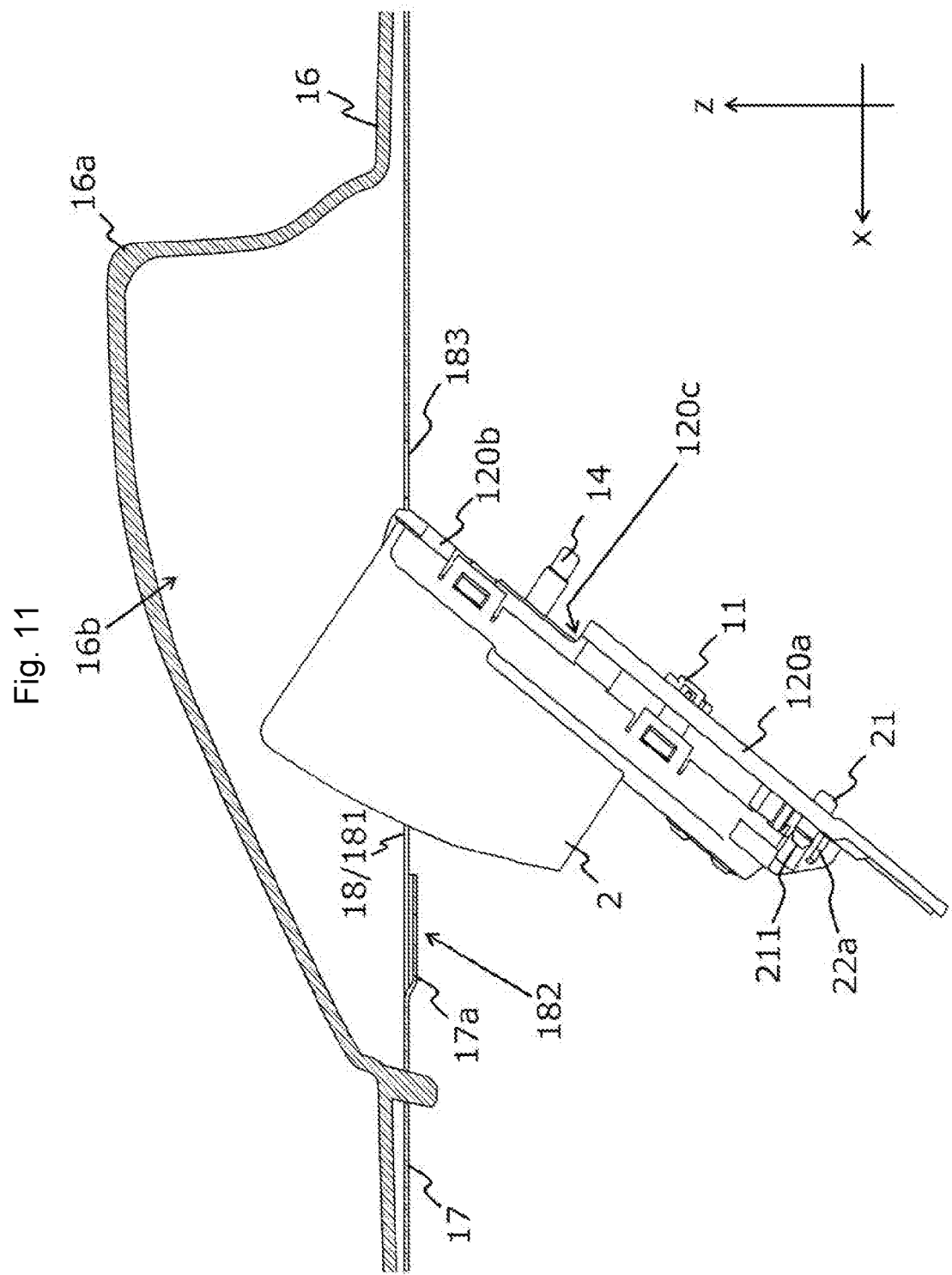
FIG. 11 is a sectional configuration diagram of a first state in the first embodiment.

In a state where the rear side of the antenna device 1 in the x direction is inclined to be higher than the front side in the x direction, the antenna device 1 is inserted into the mounting hole 18 from the lower side of the inner panel 17 in the z direction (a first state, refer to FIG. 11 and FIG. 12).

Figure 13:
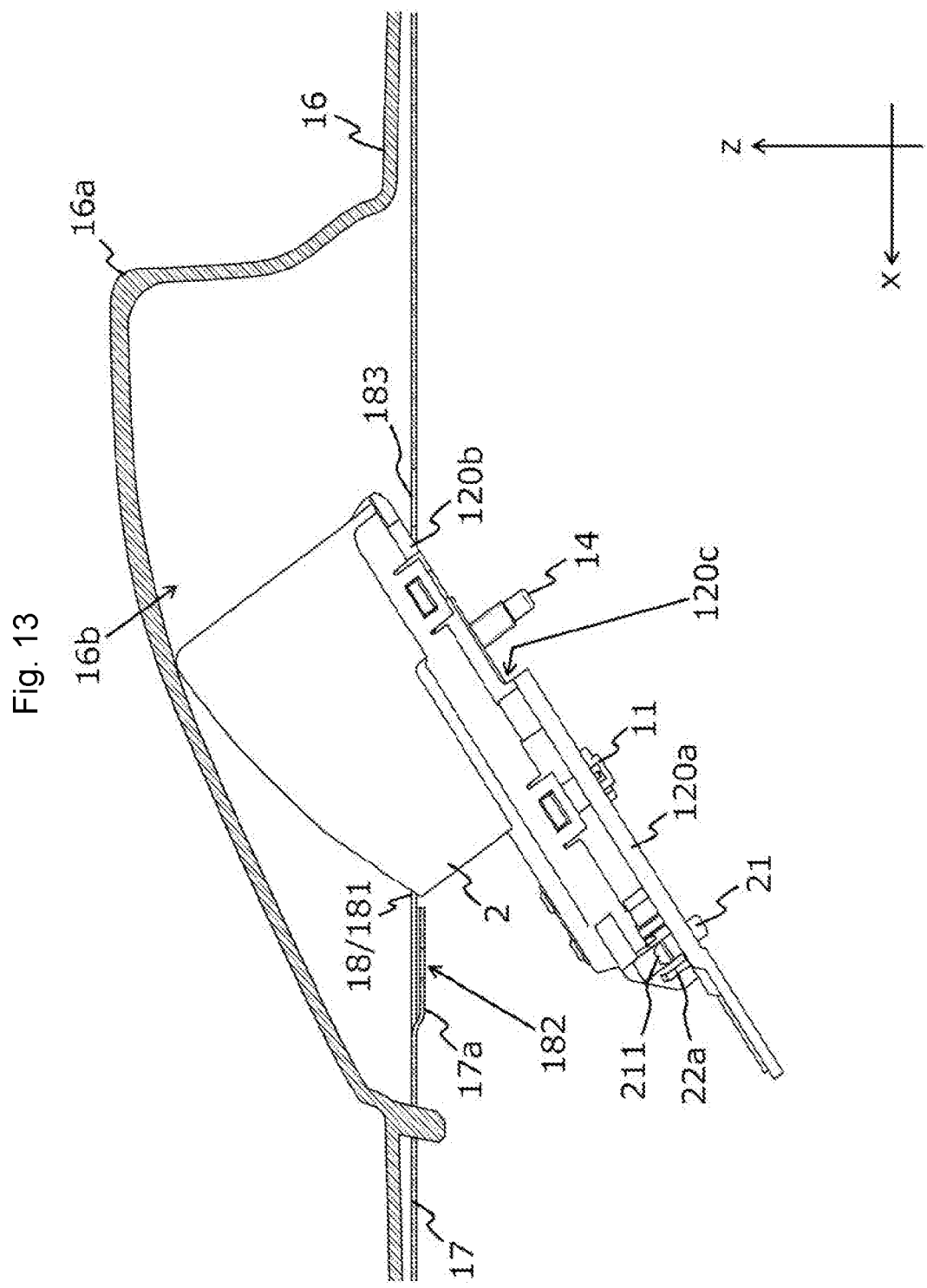
FIG. 13 is a sectional configuration diagram of a second state in the first embodiment.

In the antenna device 1, the shaft portion of the bolt 14 that extends to the lower side in the z direction from the upper portion 120b of the base 12 on the rear side in the x direction is fitted into the cutout 183 that extends to the rear side in the x direction from the mounting hole 18 (a second state, refer to FIG. 13 and FIG. 14).

The shaft portion of the bolt 14 is fitted into the cutout 183, and thus, even in a previous step where the bolt 14 is screwed to the nut 15, it is possible to prevent the rear side of the antenna device 1 in the x direction from being displaced to the y direction.

The rear side of the upper portion 120b of the base 12 in the x direction is placed on the inner panel 17.

The front side of the antenna device 1 in the x direction is pushed into the upper side in the z direction from the lower side in the z direction.

The tapered shape portions of the holding claws 211 are in contact with the boundary region with respect to the mounting hole 18 in the inner panel 17, and the holding claws 211 are pushed into the inner side in the y direction. Accordingly, the lower ends of the protruding pieces 21 in the z direction are bent to the inner side in the y direction, and the tapered shape portions of the holding claws 211 pass through the mounting hole 18 (a third state, refer to FIG. 15 and FIG. 16).

Note that, in a state where the lower ends of the protruding pieces 21 in the z direction are pinched to be bent to the inner side in the y direction, the front side of the antenna device 1 in the x direction may be pushed into the upper side in the z direction from the lower side in the z direction.

After the tapered shape portions of the holding claws 211 pass through the mounting hole 18, the bending of the protruding pieces 21 is eliminated. The inner panel 17 is disposed between the holding claw 211 and the lower portion 120a of the base 12, and the lower end of the holding claw 211 is in a position relationship of facing the inner panel 17 in the z direction.

The lower end of the holding claw 211 is in a position relationship of facing the inner panel 17 in the z direction. For this reason, unless the protruding pieces 21 are bent, it is possible to prevent the front side of the antenna device 1 in the x direction from being lowered to the lower side in the z direction from the inner panel 17.

However, in this step, a gap is generated at least between the lower end of the holding claw 211 and the upper surface of the inner panel 17 or between the lower surface of the inner panel 17 and the lower portion 120a of the base 12.

In a case where the lower ends of the protruding pieces 21 are bent to the inner side in the y direction by being pinched with fingers so that the lower ends of the holding claws 211 are in a position relationship of facing the mounting hole 18 in the z direction, the holding claws 211 are not in contact with the inner panel 17. For this reason, it is possible to simply remove the front side of the antenna device 1 in the x direction to the lower side in the z direction. That is, the protrusions are moved in the y direction, and thus, it is possible to release a state in which the holding claws 211 hold the inner panel 17 on the lower side in the z direction from the holding claws 211.

The clip 13 is inserted into the first clip inserting hole 123 in the lower portion 120a of the base 12 and the second clip inserting hole 182 of the inner panel 17 from the lower side in the z direction, on the front side in the x direction. The nut 15 is screwed to the bolt 14 on the rear side in the x direction. Accordingly, the antenna device 1 and the inner panel 17 are completely fixed.

That is, in the first embodiment, the clip 13 functions as a fixing portion for fixing the base 12 (the lower portion 120a) to the inner panel 17 on the front side in the x direction. In addition, the bolt 14 and the nut 15 function as a fixing portion for fixing the base 12 (the upper portion 120b) to the inner panel 17 on the rear side in the x direction.

The antenna device 1 is fixed to the inner panel 17 in at least two places of a place into which the clip 13 is inserted (the first clip inserting hole 123 and the second clip inserting hole 182) and a place in which the bolt 14 and the nut 15 are fastened (the bolt holding hole 125 and the cutout 183). For this reason, it is possible to fix the antenna device 1 to the vehicle in a state where the rattling is less likely to occur, compared to a case where the antenna device is fixed to the inner panel in one place.

In particular, the antenna device 1 is fixed to the inner panel 17 on the rear side in the x direction such that the inner panel 17 is interposed between the bolt 14 that is mounted on the upper portion 120b of the base 12 in the z direction and the nut 15. For this reason, it is possible to fix the antenna device 1 to the vehicle in a state where the rattling is less likely to occur, compared to a case where the fixing is performed without interposing.

In addition, the length of at least a part of the lower portion 120a of the base 12 in the predetermined direction is greater than the length of the mounting hole 18 in the predetermined direction. Further, the lower portion 120a of the base 12 is positioned on the lower side in the z direction from the inner panel 17. Further, in the lower portion 120a, there is a region (the circumference 123a of the first clip inserting hole 123, or the like) overlapping the inner panel 17 when seen from the lower side in the z direction. For this reason, when the antenna device 1 is pushed into the inner panel 17 from the lower side in the z direction, it is possible to prevent the front side of the antenna device 1 in the x direction from being erroneously thrust into the upper side in the z direction from the inner panel 17. In addition, it is possible to prevent the antenna device 1 from being displaced with respect to the inner panel 17 in the z direction after being mounted.

In addition, the rotation stopper (the first rotation stopper 22a) is in contact with the inner panel 17. For this reason, even in a case where the nut 15 is strongly screwed in a counterclockwise direction when seen from the upper side in the z direction, it is possible to prevent the antenna device 1 from being rotated in the counterclockwise direction when seen from the upper side in the z direction, in tandem with the rotation of the nut 15.

The rotation is prevented, and thus, it is possible to fix the antenna device 1 to the inner panel 17 in a predetermined aspect.

In addition, the contact between the antenna device 1 and the vehicle (the roof 16 and the inner panel 17) is prevented in a place other than the place into which the clip 13 is inserted, the place in which the bolt 14 and the nut 15 are fastened, and the place in which the rotation stopper (the first rotation stopper 22a and the second rotation stopper 22b) is provided. For this reason, it is possible to suppress the occurrence of an abnormal noise due to the contact between the antenna device 1 and the vehicle or to suppress the occurrence of an unnecessary electrical connection place between the antenna device 1 and the vehicle.

Next, a second embodiment will be described (refer to FIG. 18 to FIG. 25).

In the first embodiment, the clip 13 is fitted into the first clip inserting hole 123 that is provided in the lower portion 120a of the base 12 and the second clip inserting hole 182 that is provided in the front adjacent portion 17a of the inner panel 17, and thus, fixing the antenna device 1 on the front side in the x direction is performed.

In contrast, in the second embodiment, a cushion 19 that is provided in a cushion receiving portion 127 on the upper surface of the lower portion 120a of the base 12 is interposed between the cushion receiving portion 127 and the inner panel 17, and thus, fixing the antenna device 1 on the front side in the x direction is performed.

Hereinafter, the fixing of the antenna device 1 on the front side in the x direction will be mainly described.

Figure 21:
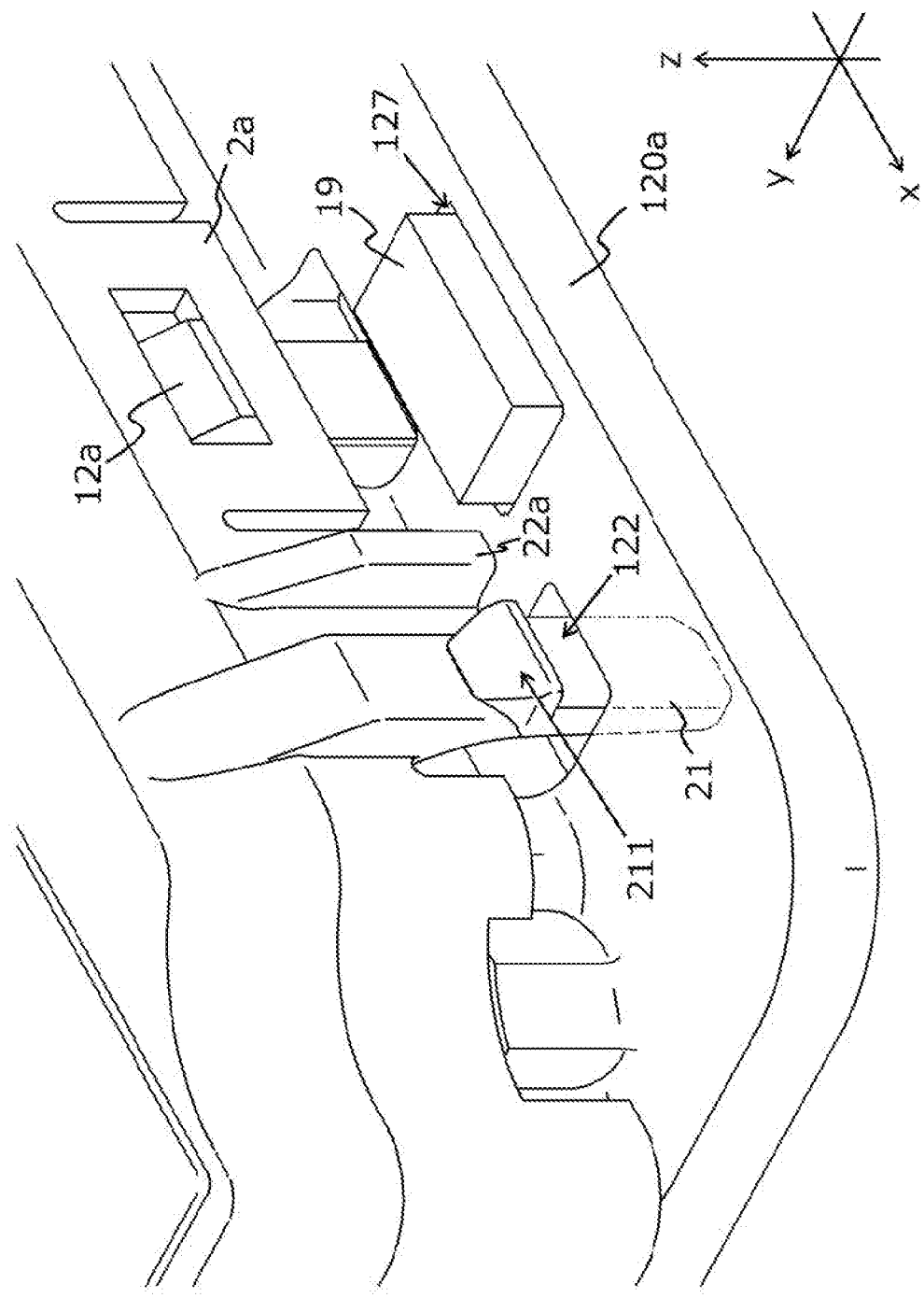
FIG. 21 is a perspective view illustrating a position relationship of a protruding piece, a holding claw, a cushion, and a base in the second embodiment.
Figure 22:
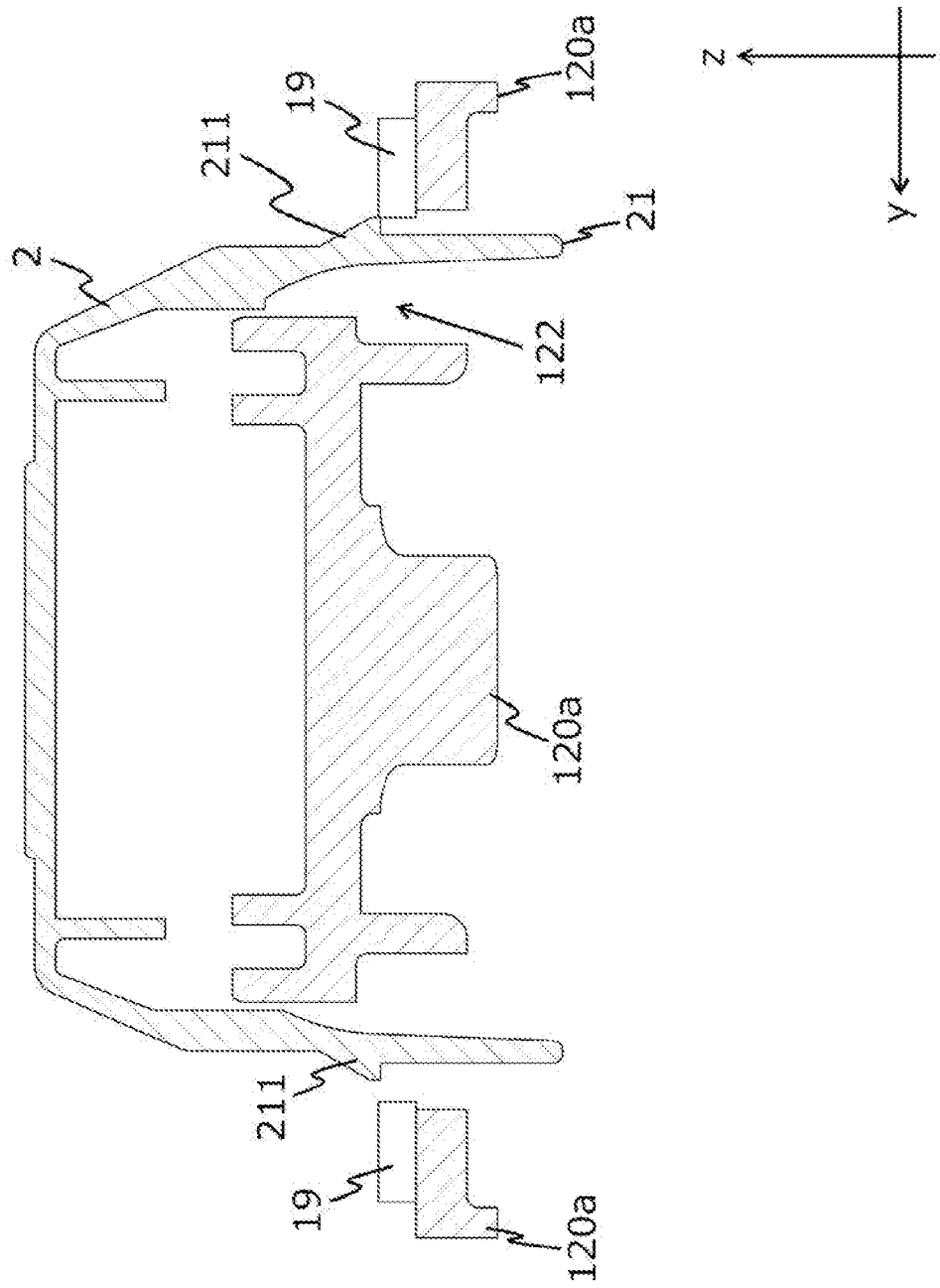
FIG. 22 is a sectional configuration diagram illustrating a position relationship of the protruding piece, the holding claw, the cushion, and the base in the second embodiment.
Figure 23:
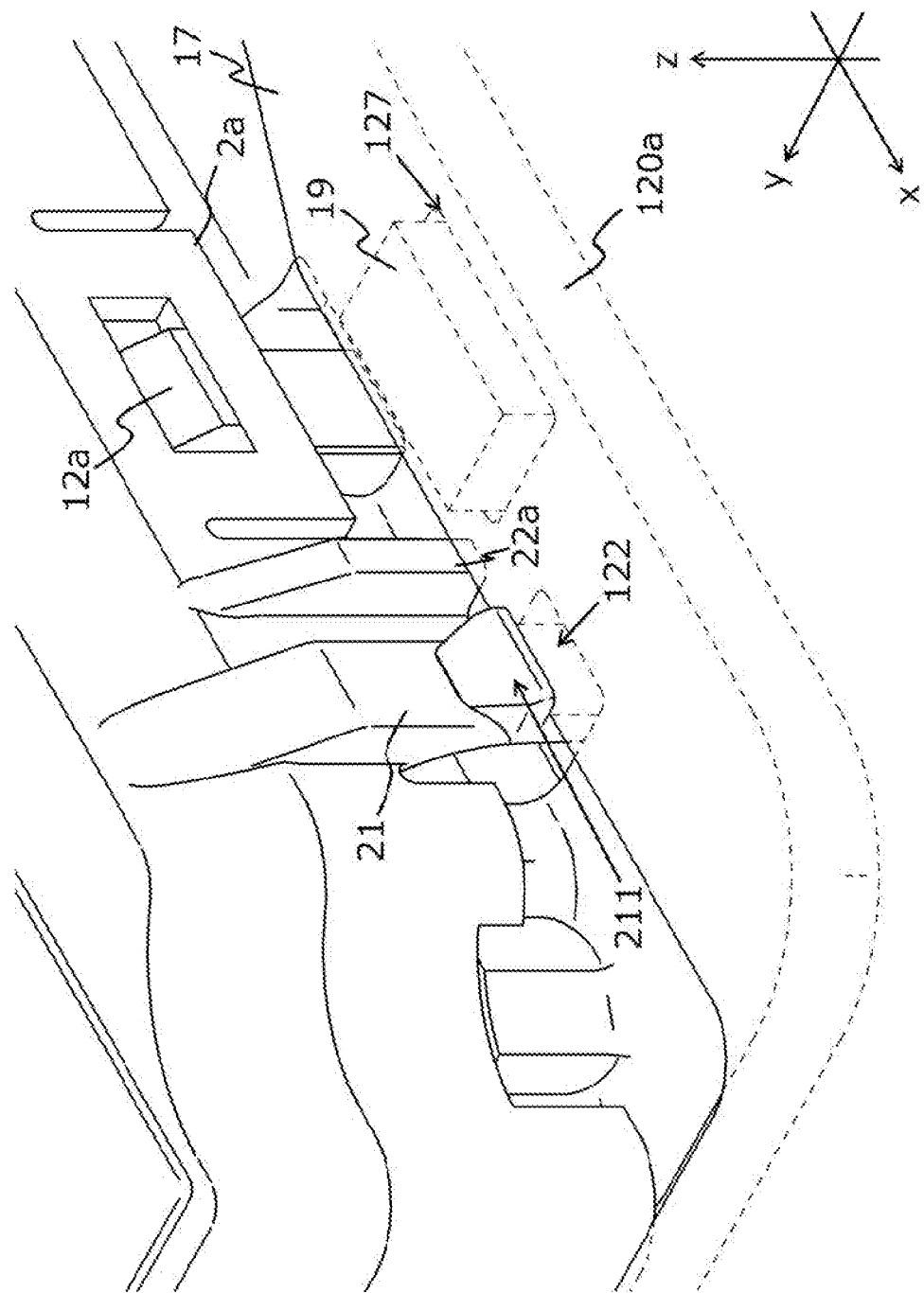
FIG. 23 is a perspective view illustrating a position relationship of the protruding piece, the holding claw, the cushion, the base, and the inner panel in the second embodiment.
Figure 24:
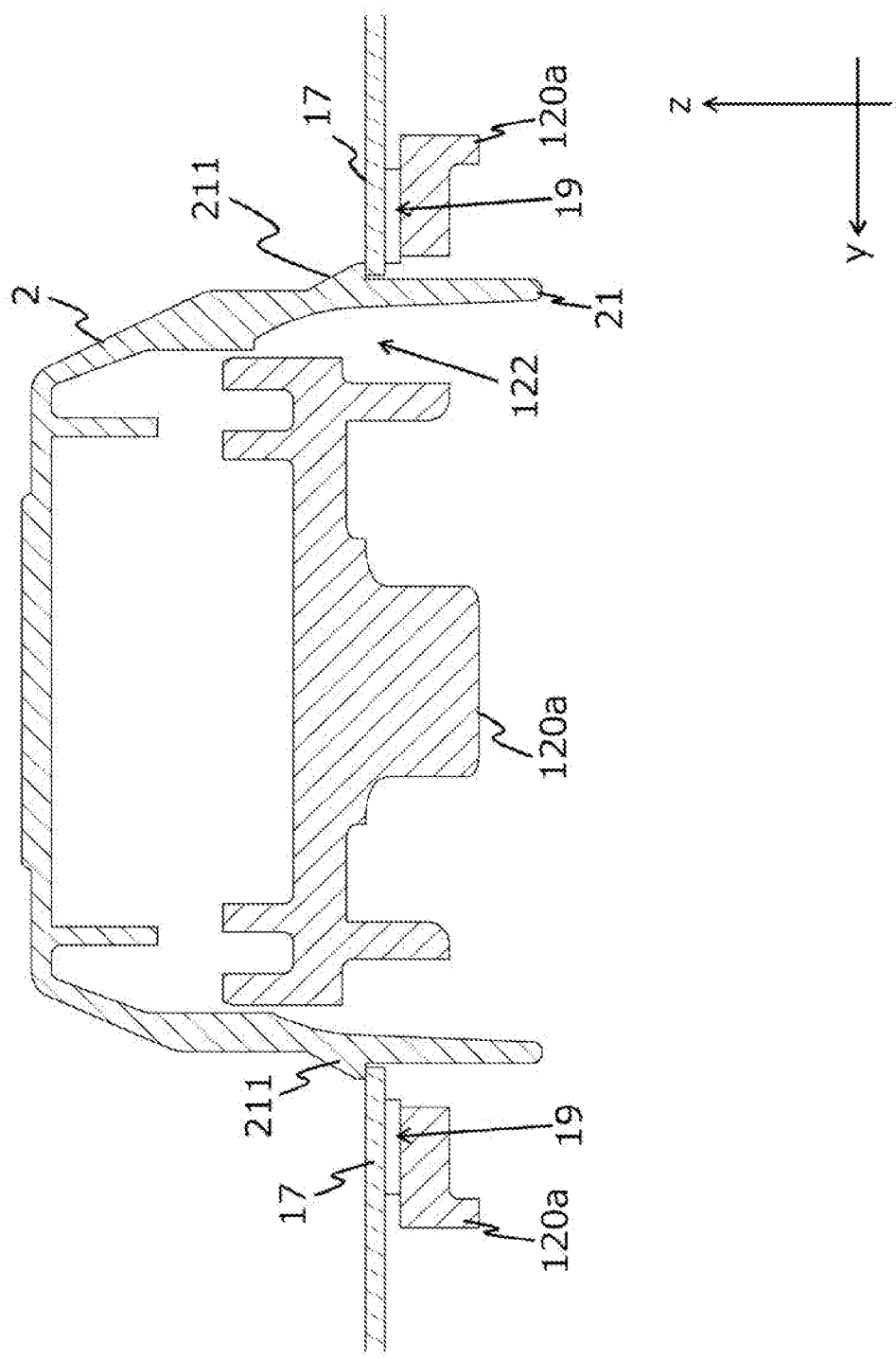
FIG. 24 is a sectional configuration diagram illustrating a position relationship of the protruding piece, the holding claw, the cushion, and the inner case in the second embodiment.

In the second embodiment, as illustrated in FIG. 21 or FIG. 22, the cushion receiving portion 127 is provided in a region facing the inner panel 17 in the z direction, on the front side of the upper surface of the lower portion 120a of the base 12 in the x direction. For example, a region in the vicinity of the protruding piece inserting hole 122 is considered as the region in which the cushion receiving portion 127 is provided.

In the cushion receiving portion 127, a recess that is approximately in the shape of a rectangular parallelepiped may be provided such that the cushion 19 is fitted thereto, or the cushion 19 may be placed on the plane of the upper surface of the lower portion 120a without the recess.

The cushion 19 is approximately in the shape of a rectangular parallelepiped, is elastically deformable at least in the z direction, and is pasted to the cushion receiving portion 127 by adhesion or the like or is placed on the cushion receiving portion 127.

When the front side of the antenna device 1 in the x direction is pushed into the mounting hole 18 of the inner panel 17 such that the holding claw 211 passes through the mounting hole 18, the cushion 19 is compressed in the z direction between the inner panel 17 and the cushion receiving portion 127. It is possible to apply a force on the upper side in the z direction to the lower surface of the inner panel 17 by a repulsive force with respect to the compression. The movement of the inner panel 17 to the upper side in the z direction is suppressed by the holding claw 211. The shape or the dimension of the cushion 19 is determined such that such an operation of each part is established.

Figure 18:
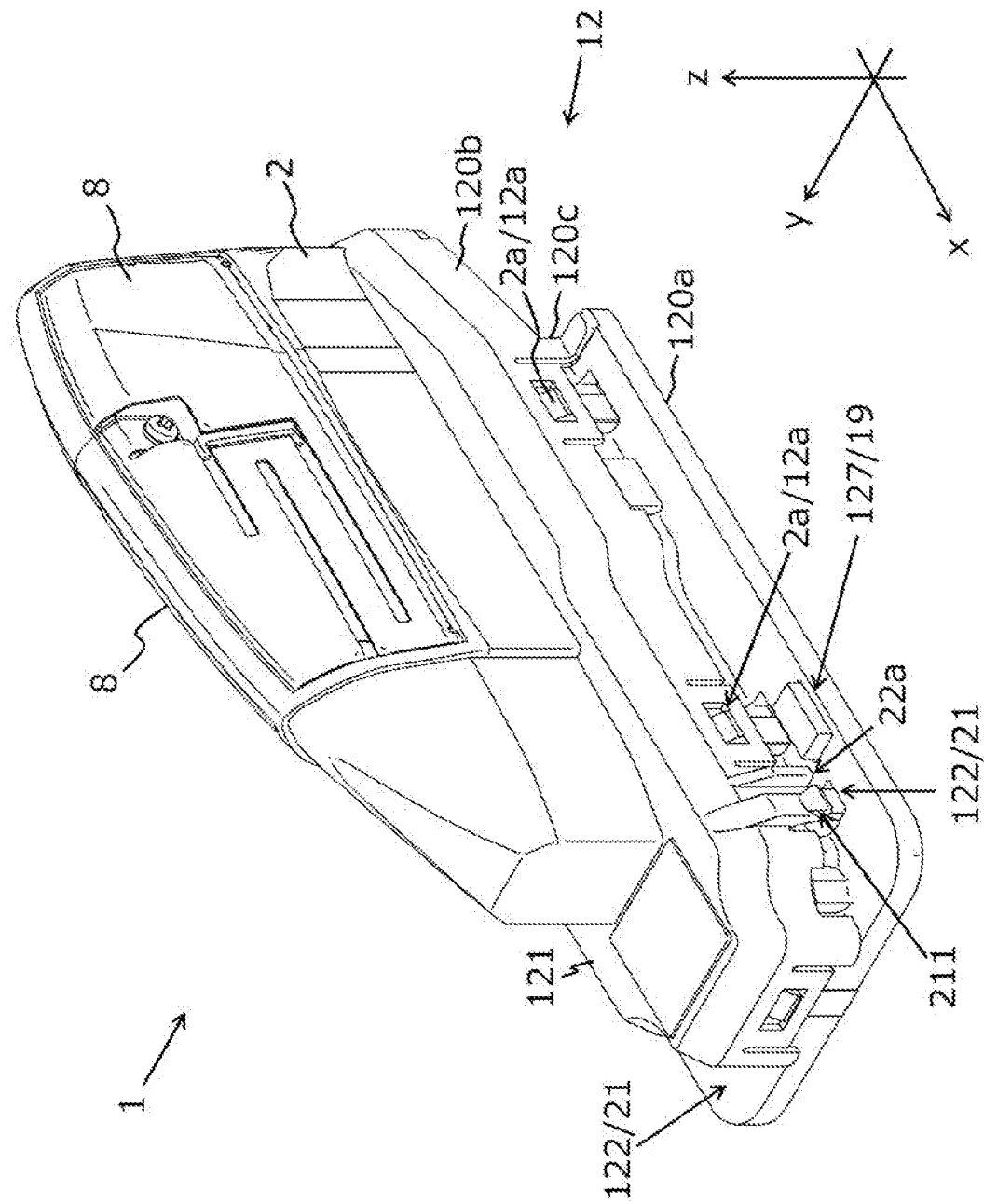
FIG. 18 is a perspective view of an antenna device of a second embodiment, from which a nut is omitted.
Figure 19:
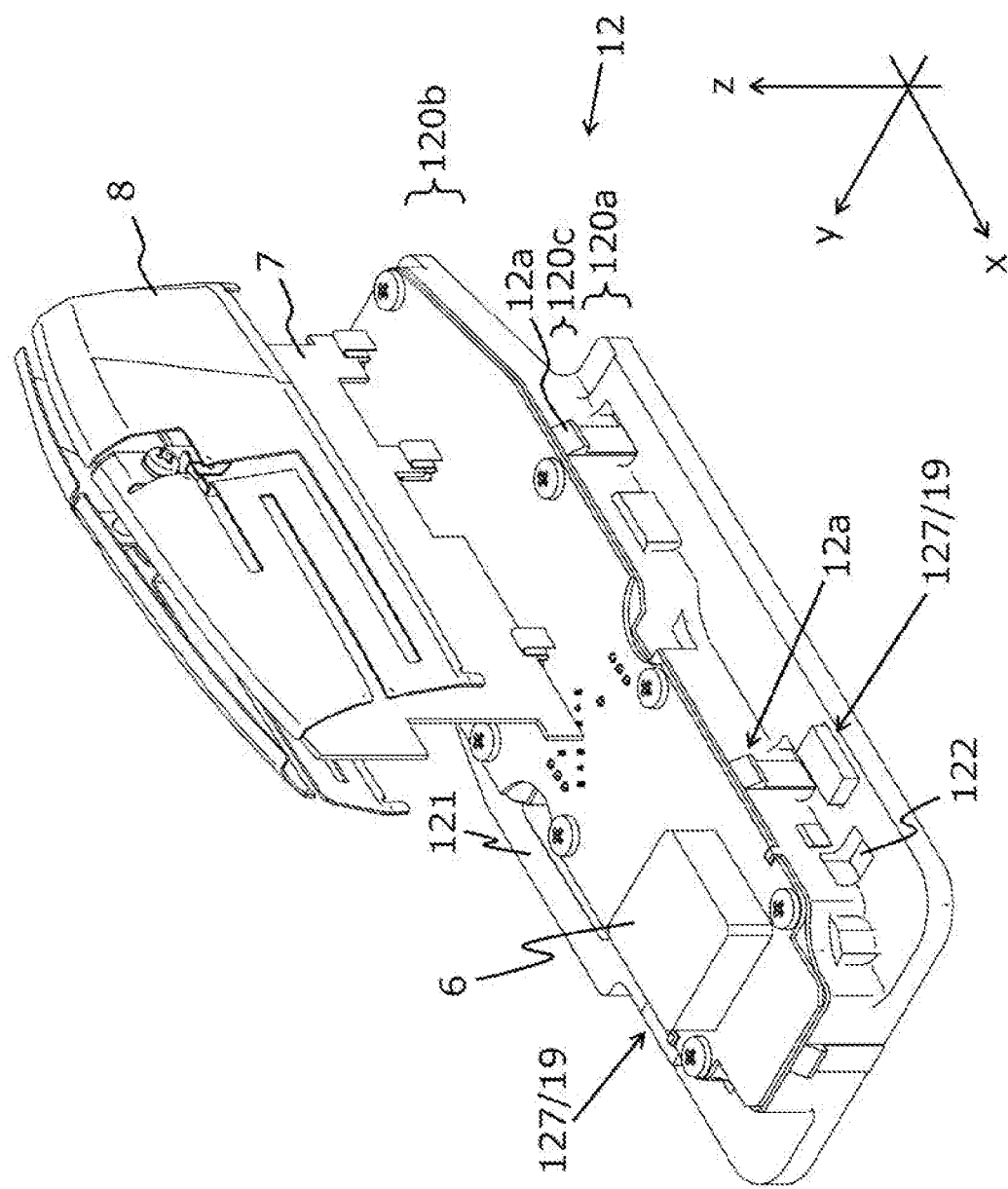
FIG. 19 is a perspective view of the antenna device of the second embodiment, from which an inner case and the nut are omitted.
Figure 20:
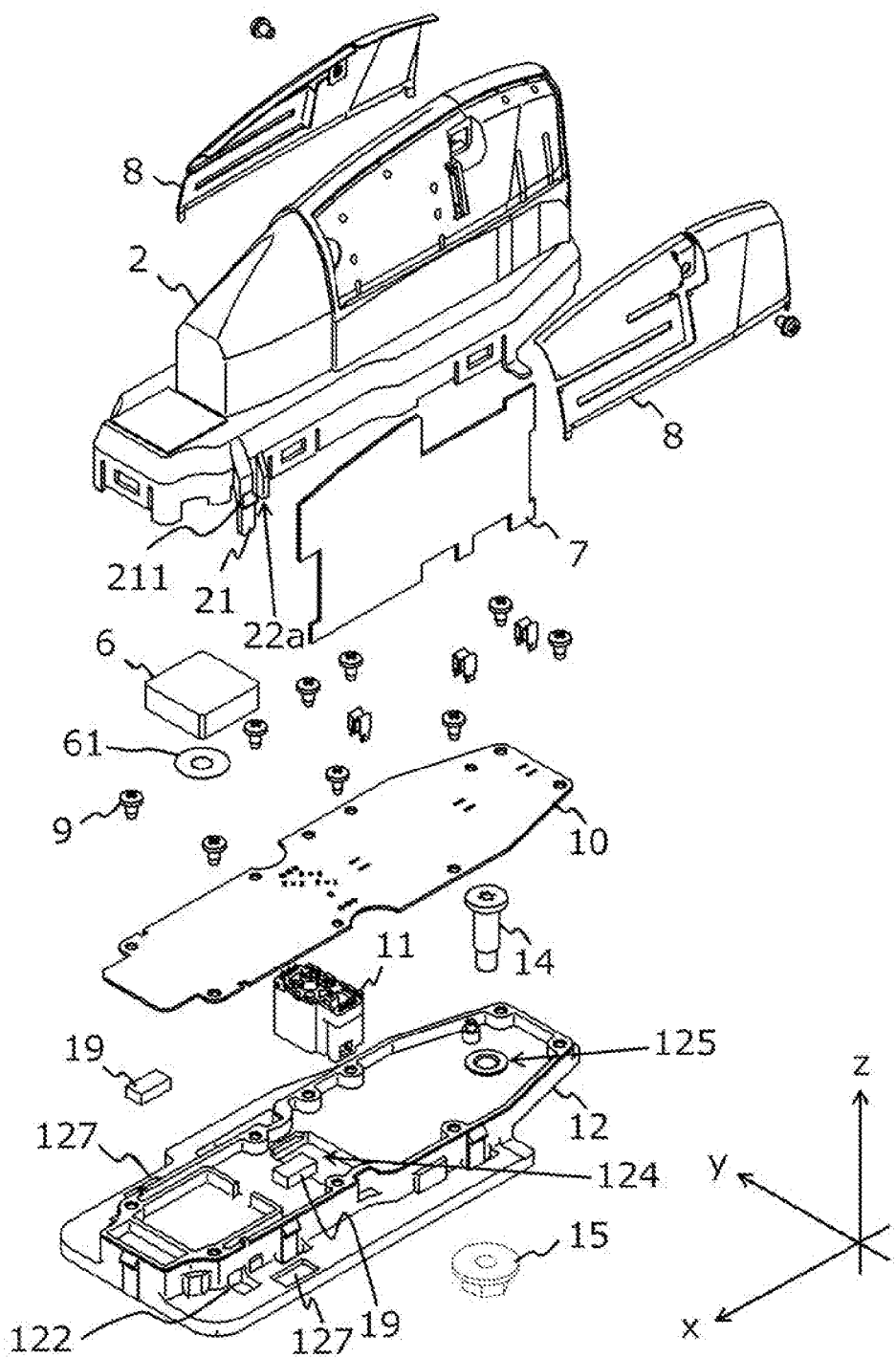
FIG. 20 is a perspective view of each part before the antenna device of the second embodiment is assembled.

Note that, as illustrated in FIG. 18 or FIG. 19, the first clip inserting hole 123 is not provided in the lower portion 120a of the base 12 of the second embodiment.

In addition, accordingly, the front adjacent portion 17a and the second clip inserting hole 182 are not provided in the inner panel 17 of the second embodiment.

In addition, the clip 13 is not provided in the antenna device 1 of the second embodiment.

Next, a procedure of fixing the antenna device 1 to the inner panel 17 in the second embodiment will be described in detail.

In a state where the rear side of the antenna device 1 in the x direction is inclined to be higher than the front side in the x direction, the antenna device 1 is inserted into the mounting hole 18 from the lower side of the inner panel 17 in the z direction.

In the antenna device 1, the shaft portion of the bolt 14 that extends to the lower side in the z direction from the upper portion 120b of the base 12 on the rear side in the x direction is fitted into the cutout 183 that extends to the rear side in the x direction from the mounting hole 18.

The rear side of the upper portion 120b of the base 12 in the x direction is placed on the inner panel 17.

The front side of the antenna device 1 in the x direction is pushed into the upper side in the z direction from the lower side in the z direction.

The tapered shape portions of the holding claws 211 are in contact with the boundary region with respect to the mounting hole 18 in the inner panel 17, and the holding claws 211 are pushed into the inner side in the y direction. Accordingly, the lower ends of the protruding pieces 21 in the z direction are bent to the inner side in the y direction, and the tapered shape portions of the holding claws 211 pass through the mounting hole 18.

Note that, in a state where the lower ends of the protruding pieces 21 in the z direction are pinched to be bent to the inner side in the y direction, the front side of the antenna device 1 in the x direction may be pushed into the upper side in the z direction from the lower side in the z direction.

After the tapered shape portions of the holding claws 211 pass through the mounting hole 18, the bending of the protruding pieces 21 is eliminated. The inner panel 17 is disposed between the holding claw 211 and the lower portion 120a of the base 12, and the lower end of the holding claw 211 is in a position relationship of facing the inner panel 17 in the z direction.

In addition, the cushion 19 is interposed between the lower portion 120a of the base 12 and the inner panel 17. A force to the upper side in the z direction is applied to the inner panel 17 by the cushion 19.

However, the holding claw 211 and the cushion 19 are in a position relationship of interposing the inner panel 17 therebetween in the z direction. For this reason, the movement of the inner panel 17 to the upper side in the z direction is suppressed by the holding claw 211.

That is, the holding claw 211 and the cushion 19 interpose the inner panel 17 therebetween in the z direction, and thus, the front side of the antenna device 1 in the x direction and the inner panel 17 are fixed in a state where the rattling does not occur (a state where displacement in the z direction does not occur).

The lower end of the holding claw 211 is in a position relationship of facing the inner panel 17 in the z direction. For this reason, unless the protruding pieces 21 are bent, it is possible to prevent the front side of the antenna device 1 in the x direction from being lowered to the lower side in the z direction from the inner panel 17.

However, in a case where the lower ends of the protruding pieces 21 are bent to the inner side in the y direction by being pinched with fingers so that the lower ends of the holding claws 211 are in a position relationship of facing the mounting hole 18 in the z direction, a state is released in which the inner panel 17 is positioned on the lower side in the z direction from the holding claws 211. For this reason, it is possible to simply remove the front side of the antenna device 1 in the x direction to the lower side in the z direction without bringing the holding claw 211 into contact with the inner panel 17.

The nut 15 is screwed to the bolt 14, and the antenna device 1 and the inner panel 17 are completely fixed.

That is, in the second embodiment, the holding claw 211 and the cushion 19 function as the fixing portion for fixing the base 12 (the lower portion 120a) to the inner panel 17 on the front side in the x direction. In addition, the bolt 14 and the nut 15 function as the fixing portion for fixing the base 12 (the upper portion 120b) to the inner panel 17 on the rear side in the x direction.

As with the first embodiment, the rotation stopper (the first rotation stopper 22a and the second rotation stopper 22b (not illustrated)) functions as a rotation stopping member for preventing the antenna device 1 from being rotated in accordance with the rotation of the nut 15.

The antenna device 1 is fixed to the inner panel 17 in at least two places of a place in which the cushion 19 and the holding claw 211 interpose the inner panel 17 therebetween and a place in which the bolt 14 and the nut 15 are fastened (the bolt holding hole 125 and the cutout 183). For this reason, it is possible to fix the antenna device 1 to the vehicle in a state where the rattling is less likely to occur, compared to a case where the antenna device is fixed to the inner panel in one place.

In particular, the antenna device 1 is fixed to the inner panel 17 on the rear side in the x direction such that the inner panel 17 is interposed between the bolt 14 that is mounted on the upper portion 120b of the base 12 in the z direction and the nut 15. For this reason, it is possible to fix the antenna device 1 to the vehicle in a state where the rattling is less likely to occur, compared to a case where the fixing is performed without interposing.

In addition, on the front side in the x direction, the cushion 19 and the holding claw 211 are provided in two places on the right and left, and are fixed in these two places on the right and left. For this reason, the place in which the fixing of the front side in the x direction is performed increases, compared to the first embodiment in which the fixing of the front side in the x direction is performed only in the place into which the clip 13 is inserted. Accordingly, in a state where the rattling is far less likely to occur, it is possible to fix the antenna device 1 to the vehicle.

In addition, the length of at least a part of the lower portion 120a of the base 12 in the predetermined direction is greater than the length of the mounting hole 18 in the predetermined direction. Further, the lower portion 120a of the base 12 is positioned on the lower side in the z direction from the inner panel 17. Further, in the lower portion 120a, there is a region (the cushion receiving portion 127 or the like) overlapping the inner panel 17 when seen from the lower side in the z direction. For this reason, when the antenna device 1 is pushed into the inner panel 17 from the lower side in the z direction, it is possible to prevent the front side of the antenna device 1 in the x direction from being erroneously thrust into the upper side in the z direction from the inner panel 17. In addition, it is possible to prevent the antenna device 1 from being displaced with respect to the inner panel 17 in the z direction after being mounted.

In addition, the rotation stopper (the first rotation stopper 22a) is in contact with the inner panel 17. For this reason, even in a case where the nut 15 is strongly screwed in a counterclockwise direction when seen from the upper side in the z direction, it is possible to prevent the antenna device 1 from being rotated in the counterclockwise direction when seen from the upper side in the z direction, in tandem with the rotation of the nut 15.

The rotation is prevented, and thus, it is possible to fix the antenna device 1 to the inner panel 17 in a predetermined aspect.

In addition, the contact between the antenna device 1 and the vehicle (the roof 16 and the inner panel 17) is prevented in a place other than the place that is in contact with the holding claw 211 (the lower end of the holding claw 211 and the upper surface of the inner panel 17), the place that is in contact with the cushion 19 (the cushion receiving portion 127 in the lower portion 120a of the base 12 and the region facing the cushion 19 in the z direction on the lower surface of the inner panel 17), the place in which the bolt 14 and the nut 15 are fastened, and the place in which the rotation stopper (the first rotation stopper 22a and the second rotation stopper 22b (not illustrated)) is provided. For this reason, it is possible to suppress the occurrence of an abnormal noise due to the contact between the antenna device 1 and the vehicle or to suppress the occurrence of an unnecessary electrical connection place between the antenna device 1 and the vehicle.

In addition, a place in which the cushion 19 that is elastically deformable is in contact with the inner panel 17 is less likely to be damaged by the cushion 19. For this reason, in a state where the inner panel 17 is less likely to be damaged, it is possible to fix the antenna device 1 to the inner panel 17.

In addition, as with the first embodiment, an antenna that is mounted on the antenna device 1 is not limited to the first antenna 4 for receiving the satellite digital radio broadcasting, the second antenna 6 for receiving the position information (the time information) from the satellite, and the third antenna 7 for performing the communication with respect to the wireless base station of the mobile telephone network. For example, any one of the first antenna 4, the second antenna 6, and the third antenna 7 may be omitted, or a fourth antenna including a capacity loading element 8 for receiving AM/FM radio broadcasting or the like may be provided.

Figure 25:
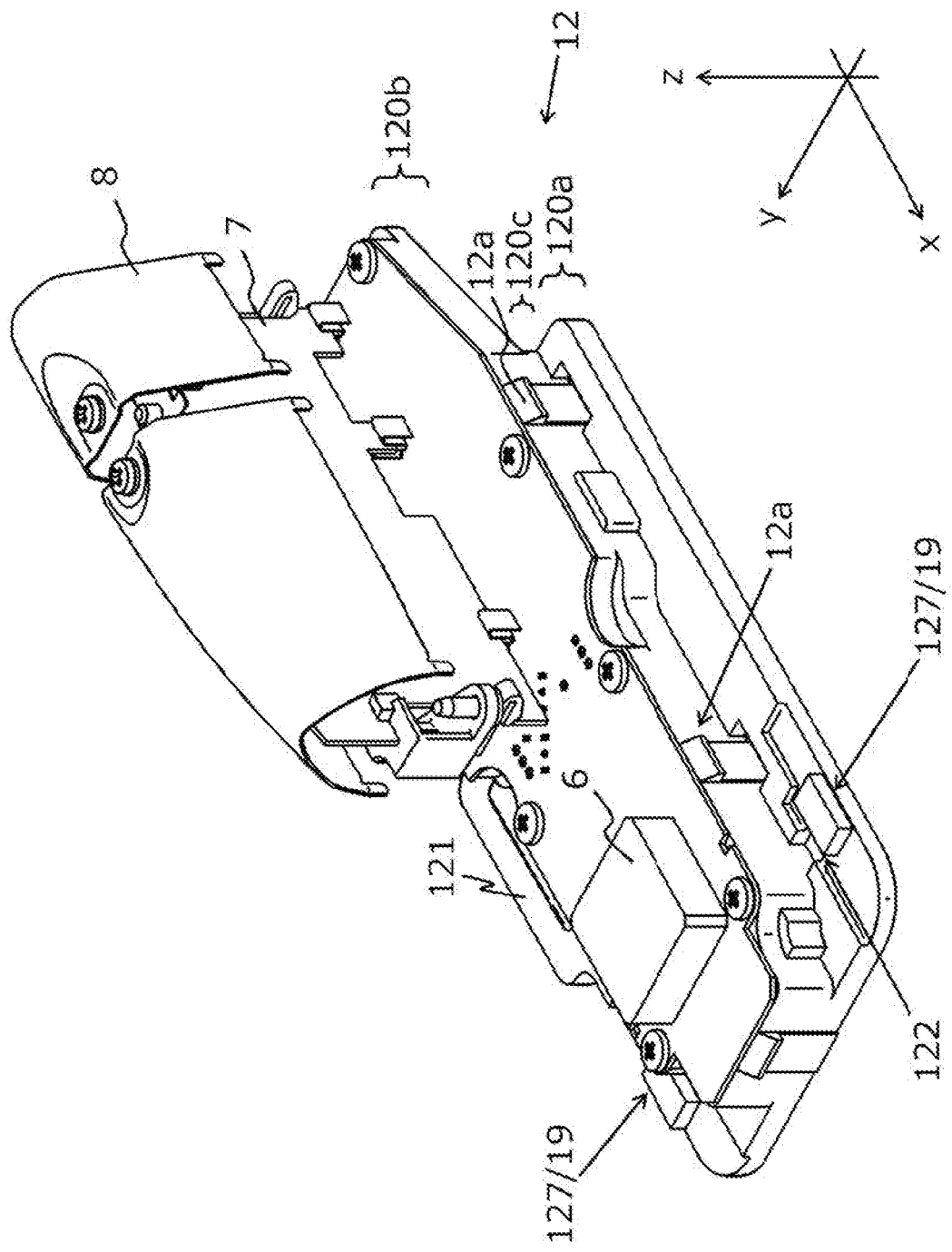
FIG. 25 is a perspective view of the antenna device of the second embodiment, using a capacity loading element that is different from that of FIG. 19, from which the inner case and the nut are omitted.
Figure 26:
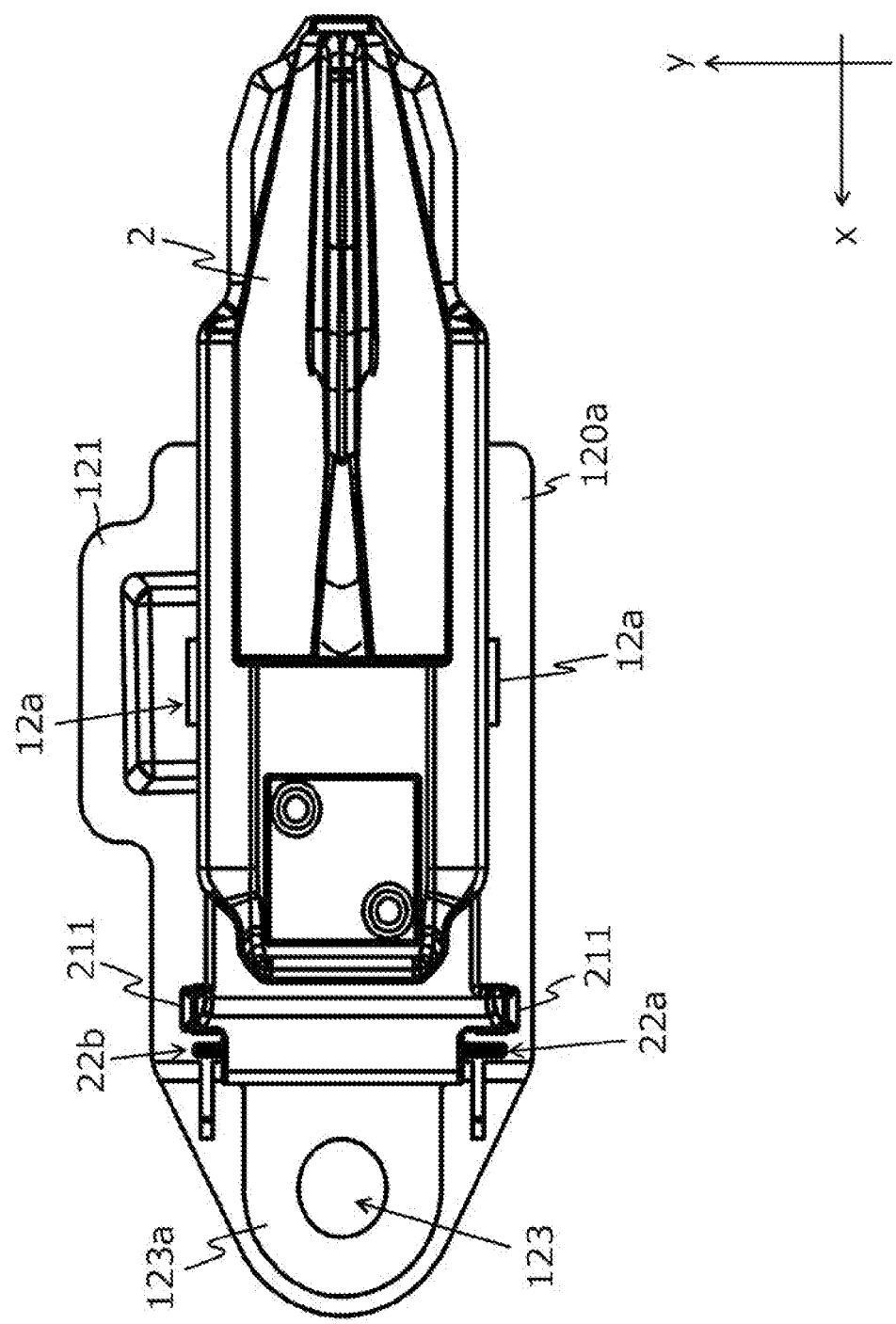
FIG. 26 is a top view of the antenna device of the first embodiment, from which the nut and the clip are omitted.
Figure 27:
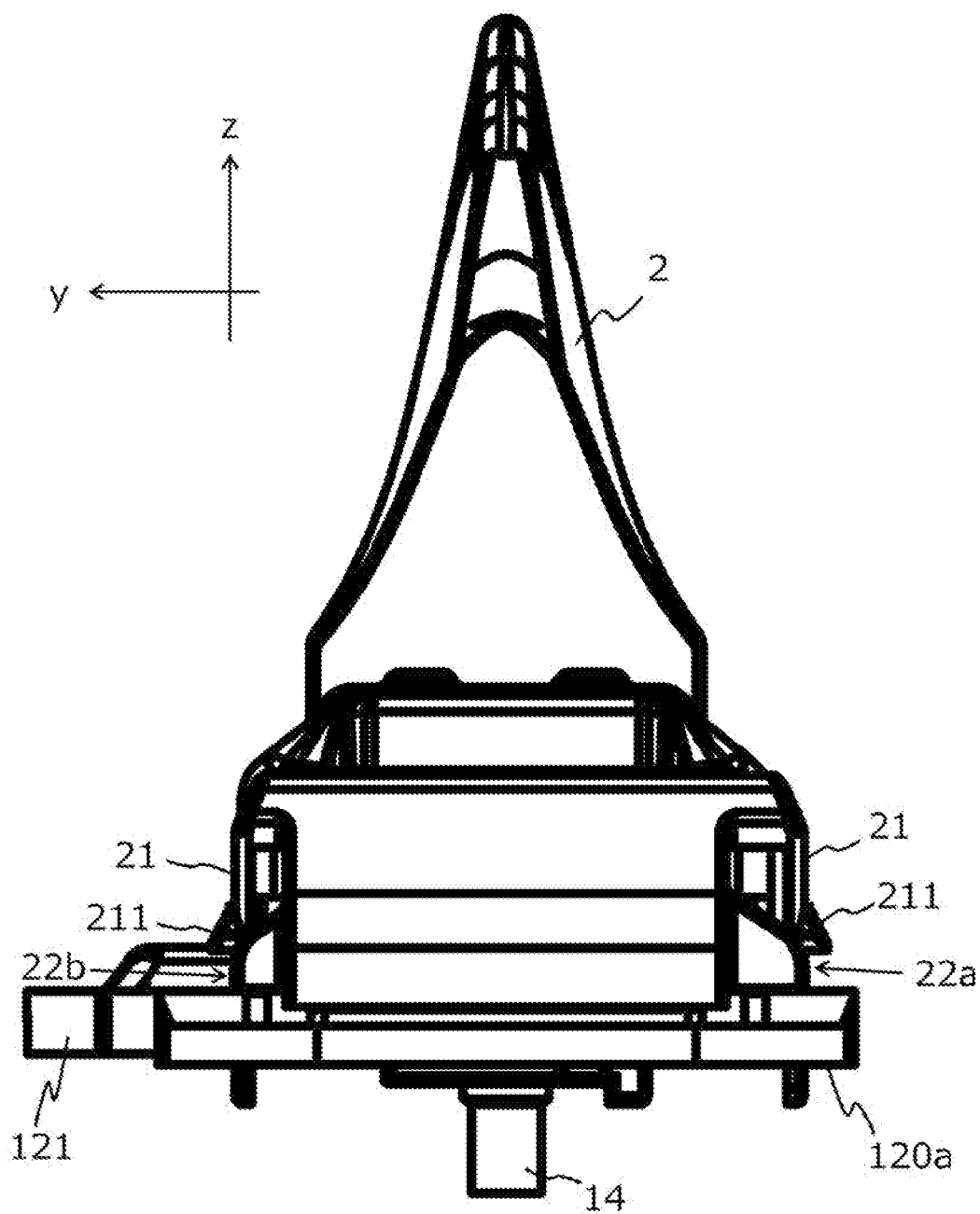
FIG. 27 is a front view of the antenna device of the first embodiment, from the nut and the clip are omitted.
Figure 28:
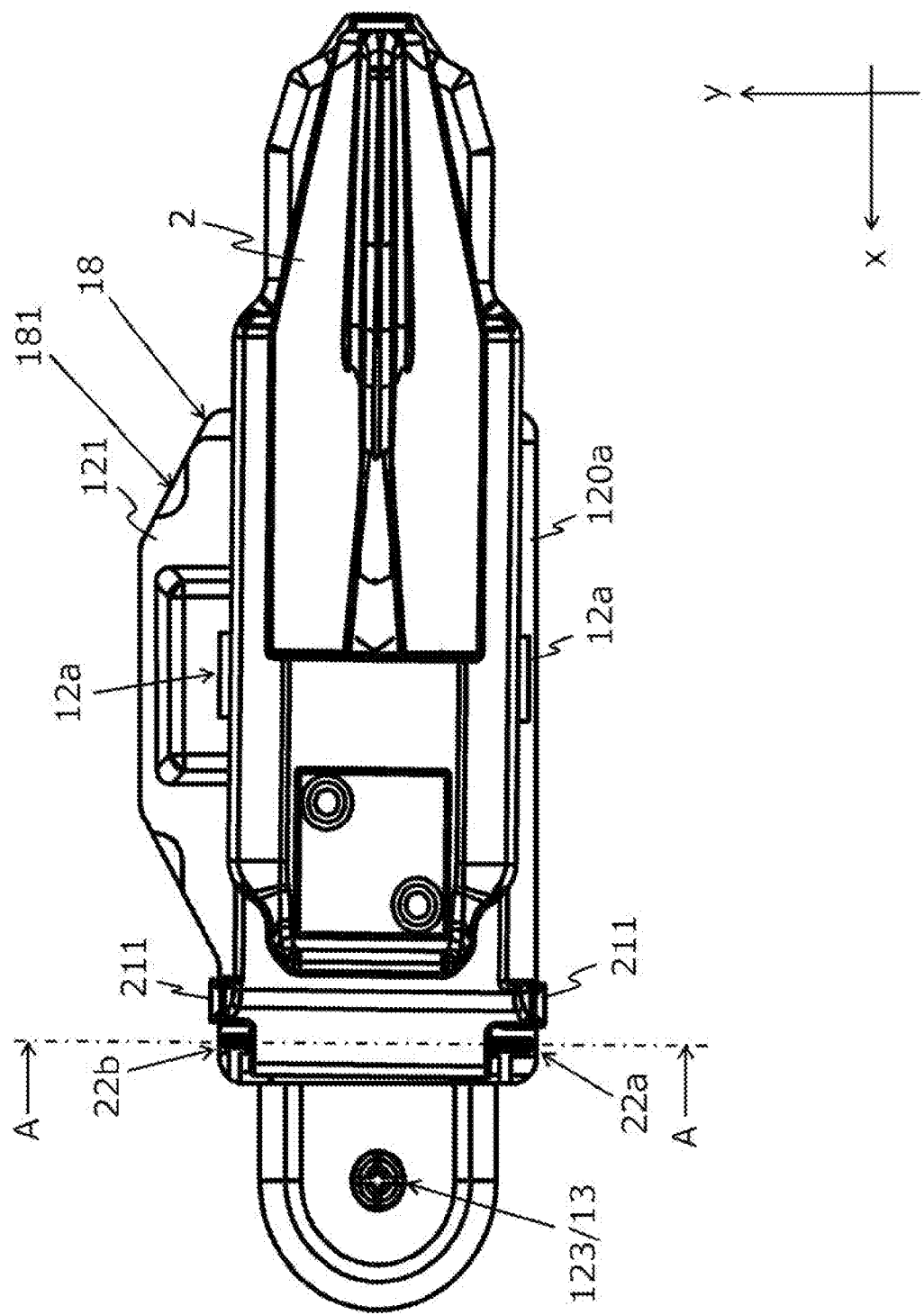
FIG. 28 is a top view illustrating a state in which the antenna device of the first embodiment is mounted on the inner panel.

Specifically, as illustrated in FIG. 18, FIG. 19, and FIG. 21, it is considered that the fourth antenna is configured by mounting two capacity loading elements 8 that are formed into the shape of a meander on a lateral surface of the inner case 2. In addition, as illustrated in FIG. 25, it is considered that the fourth antenna is configured by mounting one capacity loading element 8 that is formed into the shape of a mountain on the upper surface of the inner case 2.

In the fourth antenna, an electronic component such as a helical element (not illustrated) is provided between the capacity loading element 8 and the base 12. The electronic component such as the helical element is mounted on a vertical substrate provided with the third antenna 7.

Note that, the third antenna 7 may not be provided on the vertical substrate, that is, only the electronic component of the fourth antenna may be mounted on the vertical substrate.

Note that, in the second embodiment, it has been described that the cushion 19 is provided on the upper surface of the lower portion 120a of the base 12, and is in contact with the lower surface of the inner panel 17 (the holding claw 211 and the cushion 19 interpose the inner panel 17 therebetween). However, the cushion 19 may be provided on the lower end of the holding claw 211, and may be in contact with the upper surface of the inner panel 17 (the cushion 19 and the base 12 may interpose the inner panel 17 therebetween). In addition, the cushion 19 may be provided on both of the upper surface of the lower portion 120a of the base 12 and the lower end of the holding claw 211.

In addition, it has been described that the cushion 19 is used as a member for interposing the inner panel 17 with the holding claw 211 or a member for interposing the inner panel 17 with the base 12. However, another elastic body (rubber, a spring, or the like) may be used instead of the cushion 19.

Several embodiments of the present disclosure have been described, but these embodiments are merely presented as an example and are not intended to limit the scope of the present disclosure. These embodiments can be implemented in various other forms, and various omissions, replacements, and changes can be performed within a range not departing from the gist of the present disclosure. These embodiments and modifications thereof are included in the scope or the gist of the present disclosure, and are also included in the scope of the present disclosure described in claims and the equivalent thereof.

REFERENCE SIGNS LIST

1 ANTENNA DEVICE
2 INNER CASE
2a FIRST ENGAGING PORTION
21 PROTRUDING PIECE
211 HOLDING CLAW
22a, 22b FIRST ROTATION STOPPER, SECOND ROTATION STOPPER
3 PARASITIC ELEMENT
4 FIRST ANTENNA
41 FIRST DOUBLE-FACED TAPE
6 SECOND ANTENNA
61 SECOND DOUBLE-FACED TAPE
7 THIRD ANTENNA
8 CAPACITY LOADING ELEMENT
9 MOUNTING SCREW
10 SUBSTRATE
11 CONNECTOR
12 BASE
12a SECOND ENGAGING PORTION
120a LOWER PORTION
120b UPPER PORTION
120c CONNECTING PORTION
121 PROTRUDING PORTION
122 PROTRUDING PIECE INSERTING HOLE
123 FIRST CLIP INSERTING HOLE
123a CIRCUMFERENCE OF FIRST CLIP INSERTING HOLE
124 CONNECTOR INSERTING HOLE
125 BOLT HOLDING HOLE
126 RECESSED PORTION
127 CUSHION RECEIVING PORTION
13 CLIP
14 BOLT
15 NUT
16 ROOF
16a REGION UPRAISED TO UPPER SIDE IN z DIRECTION
17 INNER PANEL
17a FRONT ADJACENT PORTION
17b PERIPHERAL REGION OF CUTOUT
18 MOUNTING HOLE
181 HOLE PORTION
182 SECOND CLIP INSERTING HOLE
183 CUTOUT

The invention claimed is:

1. An antenna device to be mounted on a vehicle including an inner panel that is provided with a mounting hole, and a roof of the vehicle in which a region facing the inner panel on an upper side of the inner panel is upraised to an upper side, the antenna device comprising:
   a base; and
   a fixing portion that fixes the base to the inner panel,
   wherein at least a part of the antenna device is contained in a space formed between the region of the roof that is upraised and the inner panel, and
   the base and the inner panel are fixed by the fixing portion in a plurality of places.

2. The antenna device according to claim 1,
   wherein the base includes an upper portion that is positioned on an upper side from the inner panel, and
   at least one of the plurality of places in which the base and the inner panel are fixed by the fixing portion is provided in the upper portion.

3. The antenna device according to claim 1,
   wherein the fixing portion includes a bolt that extends to a lower side from the base, and a nut that is screwed to the bolt, and
   a cutout into which the bolt is fitted before being screwed to the nut is formed integrally with the mounting hole.

4. The antenna device according to claim 1,
   wherein a length of at least a part of the base in a predetermined direction is greater than a length of the mounting hole in the predetermined direction.

5. The antenna device according to claim 1, further comprising:

a holding claw that includes a tapered shape portion widened towards a lower side,
wherein the holding claw is capable of holding the inner panel on the lower side from the holding claw.

6. The antenna device according to claim 5, further comprising:
a protrusion that is provided with the holding claw and extends to the lower side from the inner panel,
wherein the protrusion is capable of being moved in a specific direction by applying a force, and
the protrusion is moved in the specific direction, and thus, the holding claw is capable of being released from a state of holding the inner panel on the lower side from the holding claw.

7. The antenna device according to claim 5,
wherein the fixing portion includes an elastic body,
the base includes a lower portion that is positioned on the lower side from the inner panel, and
the elastic body is provided on at least one of a lower end of the holding claw and an upper surface of the lower portion.

8. The antenna device according to claim 1, further comprising:
an inner case which is provided between the inner panel and the roof,
wherein a rotation stopper is provided on the inner case, the rotation stopper being contactable with a boundary region with respect to the mounting hole in the inner panel.

9. The antenna device according to claim 1,
wherein at least the part of the antenna device is disposed in the space from the mounting hole in the inner panel,
at least one of the plurality of places on the base which are fixed to the inner panel is provided in the space, and
one or more others of the plurality of places on the base which are fixed to the inner panel are provided out of the space.

10. A vehicle comprising:
an inner panel having a mounting hole;
a roof of the vehicle that opposes the inner panel, the roof having an upraised portion that extends away from the inner panel to form a space between the roof and the inner panel; and
an antenna that is at least partially disposed in the space between the roof and the inner panel, the antenna including
a base, and
a fixing portion that fixes the base to the inner panel in a plurality of places.

11. The vehicle according to claim 10,
wherein the base includes an upper portion that, with respect to the inner panel, is positioned on an upper side, and
at least one of the plurality of places at which the base and the inner panel are fixed by the fixing portion is provided in the upper portion.

12. The vehicle according to claim 10,
wherein the fixing portion includes a bolt that extends to a lower side from the base, and a nut that is screwed to the bolt, and
a cutout into which the bolt is fitted before being screwed to the nut is formed integrally with the mounting hole.

13. The vehicle according to claim 10,
wherein a length of at least a pan of the base in a predetermined direction is greater than a length of the mounting hole in the predetermined direction.

14. The vehicle according to claim 10,
wherein the antenna comprises a holding claw that includes a tapered shape portion widened towards a lower side, and
wherein the holding claw holds the inner panel on the lower side from the holding claw.

15. The vehicle according to claim 14,
wherein the antenna comprises a protrusion that is provided with the holding claw and extends to the lower side from the inner panel,
wherein the protrusion is movable in a specific direction by applying a force thereto, and
in response to the protrusion being moved in the specific direction, the holding claw is released from a state of holding the inner panel on the lower side from the holding claw.

16. The vehicle according to claim 14, wherein
the fixing portion includes an elastic body,
the base includes a lower portion that is positioned on the lower side from the inner panel, and
the elastic body is provided on at least one of a lower end of the holding claw and an upper surface of the lower portion.

17. The vehicle according to claim 10,
wherein the antenna includes an inner case which is provided between the inner panel and the roof,
wherein a rotation stopper is provided on the inner case, the rotation stopper being contactable with a boundary region with respect to the mounting hole in the inner panel.

18. The vehicle according to claim 10,
wherein at least the part of the antenna device is disposed in the space from the mounting hole in the inner panel,
at least one of the plurality of places on the base which are fixed to the inner panel is provided in the space, and
one or more others of the plurality of places on the base which are fixed to the inner panel are provided out of the space.

* * * * *